US010290379B2

United States Patent
Sato et al.

(10) Patent No.: US 10,290,379 B2
(45) Date of Patent: May 14, 2019

(54) PASSIVE CONTAINMENT COOLING AND FILTERED VENTING SYSTEM, AND NUCLEAR POWER PLANT

(71) Applicant: Kabushiki Kaisha Toshiba, Minato-ku (JP)

(72) Inventors: Takashi Sato, Yokohama (JP); Keiji Matsumoto, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 107 days.

(21) Appl. No.: 15/322,649

(22) PCT Filed: Jul. 2, 2015

(86) PCT No.: PCT/JP2015/003329
§ 371 (c)(1),
(2) Date: Dec. 28, 2016

(87) PCT Pub. No.: WO2016/002224
PCT Pub. Date: Jan. 7, 2016

(65) Prior Publication Data
US 2017/0162281 A1 Jun. 8, 2017

(30) Foreign Application Priority Data
Jul. 3, 2014 (JP) .................. 2014-138090

(51) Int. Cl.
*G21C 9/00* (2006.01)
*G21C 15/18* (2006.01)
(Continued)

(52) U.S. Cl.
CPC ............. *G21C 9/004* (2013.01); *G21C 9/012* (2013.01); *G21C 1/084* (2013.01); *G21C 13/10* (2013.01); *G21C 15/18* (2013.01); *Y02E 30/40* (2013.01)

(58) Field of Classification Search
CPC ...... G21C 9/004; G21C 9/012; G21C 13/022; G21C 15/18
See application file for complete search history.

(56) References Cited

U.S. PATENT DOCUMENTS 4,948,554 A * 8/1990 Gou ................. G21C 9/012
376/283
5,272,737 A * 12/1993 Fujii ................. G21C 15/18
376/283
(Continued)

FOREIGN PATENT DOCUMENTS

JP  2004-333357 A  11/2004
JP  2013-170883 A  9/2013
(Continued)

OTHER PUBLICATIONS

International Search Report dated Oct. 6, 2015 in PCT/JP15/003329 Filed Jul. 2, 2016.

*Primary Examiner* — Sharon M Davis
(74) *Attorney, Agent, or Firm* — Oblon, McClelland, Maier & Neustadt L.L.P.

(57) ABSTRACT

A passive containment cooling and filtered venting system includes: an outer well; a scrubbing pool arranged in the outer well; a cooling water pool installed above the dry well and the outer well; a heat exchanger partly submerged in the cooling water; a gas supply pipe that is connected to the inlet plenum of the ruin of the heat exchanger at one end and connected to a gas phase region of the containment vessel at the other end; a condensate return pipe that is connected to the outlet plenum of the heat exchanger at one end, and connected to inside the containment vessel at other end; and a gas vent pipe that is connected to the outlet plenum of the heat exchanger at one end and is submerged in the scrubbing pool at other end.

16 Claims, 14 Drawing Sheets

(51) Int. Cl.
 *G21C 9/004* (2006.01)
 *G21C 9/012* (2006.01)
 *G21C 1/08* (2006.01)
 *G21C 13/10* (2006.01)

(56) References Cited

U.S. PATENT DOCUMENTS

| | | | | | |
|---|---|---|---|---|---|
| 5,295,169 | A | * | 3/1994 | Tominaga | G21C 9/004 376/283 |
| 5,353,318 | A | * | 10/1994 | Gluntz | G21C 9/012 376/283 |
| 5,377,243 | A | * | 12/1994 | Hill | G21C 15/18 376/283 |
| 2013/0259184 | A1 | | 10/2013 | Sato | |
| 2014/0003567 | A1 | | 1/2014 | Sato et al. | |

FOREIGN PATENT DOCUMENTS

| | | |
|---|---|---|
| JP | 2014-10080 A | 1/2014 |
| JP | 2014-081219 A | 5/2014 |
| WO | 2012/073411 A1 | 6/2012 |

\* cited by examiner

PASSIVE CONTAINMENT COOLING AND FILTERED VENTING SYSTEM, AND NUCLEAR POWER PLANT

TECHNICAL FIELD

Embodiments of the present invention relate to a passive containment cooling and filtered venting system of a nuclear power plant, and a nuclear power plant.

BACKGROUND ART

An outline of a conventional passive containment cooling system of a nuclear power plant will be described with reference to FIGS. 11 to 14.

FIG. 11 is a sectional elevational view showing an example of a configuration of the conventional passive containment cooling system. In FIG. 11, a core 1 is contained in a reactor pressure vessel 2. The reactor pressure vessel 2 is contained in a containment vessel 3. The containment vessel 3 has a cylindrical shape (see FIG. 12).

The interior space in the containment vessel 3 is partitioned into a dry well 4, which contains the reactor pressure vessel 2, and a wet well 5. The dry well 4 and the wet well 5 each constitutes a part of the containment vessel 3. The wet well 5 forms a suppression pool 6 inside. A wet well gas phase 7 is formed above the suppression pool 6. The outer wall parts of the dry well 4 and the wet well 5 are integrated to constitute a cylindrical outer wall part of the containment vessel 3. The ceiling part of the dry well 4 is a flat plate, which will be referred to as a top slab 4a of the dry well 4.

In the case of a boiling water reactor, the atmosphere in the containment vessel 3 is inerted by nitrogen and limited to a low oxygen concentration. In the case of the boiling water reactor, the containment vessel 3 is contained in a nuclear reactor building 100.

In general, there are various types of containment vessels 3 depending on the materials. Examples include a steel containment vessel, a reinforced concrete containment vessel (RCCV), a pre-stressed concrete containment vessel (PCCV), and a steel concrete composite (SC composite) containment vessel (SCCV). In the cases of RCCV and PCCV, the inner surfaces are lined with a steel liner. FIG. 11 shows an example of an RCCV. As shown in FIG. 12, an RCCV has an outer wall part of cylindrical shape.

The reactor pressure vessel 2 is supported by a cylindrical pedestal 61 via an RPV skirt 62 and an RPV support 63. The pedestal 61 may be made of steel, concrete, or a composite structure of both. In the dry well 4, the inside space of the pedestal 61, below the reactor pressure vessel 2 and surrounded by the cylindrical wall of the pedestal 61, is referred to as a pedestal cavity 61a. In the case of the RCCV of an ABWR, the cylindrical wall of the pedestal 61 forms a boundary wall between the wet well 5 and the dry well 4. The space is referred to as a lower dry well in particular.

A containment vessel head 10 is arranged above the reactor pressure vessel 2. A water shield 11 is arranged over the containment vessel head 10.

Main steam pipes 71 extend from the reactor pressure vessel 2 to outside the dry well 4. A safety relief valve (SRV) 72 is arranged on the main steam pipes 71. A discharge pipe 73 is arranged to be submerged in the suppression pool 6 so that the steam in the reactor pressure vessel 2 is released into the suppression pool 6 if the safety relief valve 72 is activated.

The dry well 4 and the suppression pool 6 are connected by LOCA vent pipes 8. There are installed a plurality of, for example, ten LOCA vent pipes 8, whereas FIG. 11 shows only two of them (see FIG. 12). The LOCA vent pipes 8 have horizontal vent pipes 8a in the portions submerged in the pool water of the suppression pool 6. The horizontal vent pipes 8a open in the pool water. In the case of an RCCV, three horizontal vent pipes 8a are vertically arranged on each LOCA vent pipe 8. In the case of the RCCV the LOCA vent pipes 8 are installed through the cylindrical wall of the pedestal 61. In the case of the RCCV, the cylindrical wall of the pedestal 61 is thus also referred to as a vent wall. The vent wall is made of reinforced concrete with a thickness of approximately 1.7 m. The inner and outer surfaces are made of steel. The LOCA vent pipes 8 and the pedestal 61 constitute a part of the containment vessel 3.

Vacuum breakers 9 are provided for the purpose of letting the gas in the wet well gas phase 7 flow back into the dry well 4. There are provided a plurality of, for example, eight vacuum breakers 9, whereas FIG. 11 shows only one of them.

The vacuum breakers 9 may be formed on the wall surface of the wet well 5, on the ceiling of the wet well 5, and on the LOCA vent pipes 8. The vacuum breakers 9 are activated to open if the pressure in the wet well 5 exceeds that in the dry well 4 and the difference in pressure exceeds a set pressure difference. For example, the set pressure difference of the vacuum breakers 9 is approximately 2 psi (approximately 13.79 kPa). The vacuum breakers 9 constitute a part of the containment vessel 3.

A cooling water pool 13 of a passive containment cooling system 12 is arranged outside the containment vessel 3. The cooling water pool 13 stores cooling water 14 inside. FIG. 11 shows an example of the cooling water pool 13 of a tank type, whereas the cooling water pool 13 may be of a pool type. In the case of the pool type, the cooling water pool 13 is covered with a lid from above. FIG. 11 shows an example where the cooling water pool 13 and the like are installed inside the nuclear reactor building 100. The cooling water pool 13 and the like may be installed in an adjacent auxiliary building or the like.

An exhaust port 15 for releasing steam to the environment is extended from the gas phase above the water surface in the cooling water pool 13. An insect screen may be arranged on the outlet of the exhaust port 15. The cooling water pool 13 is usually located above the containment vessel 3. The cooling water pool 13 may be arranged beside the containment vessel 3.

A heat exchanger 16 is installed in the cooling water pool 13 to be submerged at least in part in the cooling water 14.

A plurality of the heat exchangers 16 may often be installed, although FIG. 11 shows only one heat exchanger 16. The heat exchanger 16 includes an inlet plenum 17, an outlet plenum 18, and heat exchanger tubes 19 (see FIG. 13).

FIG. 11 shows an example in which only the heat exchanger tubes 19 are installed inside the cooling water pool 13, and the inlet plenum 17 and the outlet plenum 18 (FIG. 13) protrude out of the cooling water pool 13. However, the configuration is not limited to this example. For example, the entire heat exchanger 16, including the inlet plenum 17 and the outlet plenum 18, may be installed inside the cooling water pool 13.

The inlet plenum 17 is connected with a gas supply pipe 20 for supplying the gas in the dry well 4. One end of the gas supply pipe 20 is connected to the dry well 4.

The outlet plenum 18 is connected with a condensate return pipe 21 and a gas vent pipe 22. One end of the condensate return pipe 21 is connected to inside the containment vessel 3. FIG. 11 shows an example in which the condensate return pipe 21 is led into a LOCA vent pipe 8. However, the configuration is not limited to this example. For example, the condensate return pipe 21 may be led into the dry well 4 or into the suppression pool 6.

The installation into the LOCA vent pipe 8 has a problem of increasing the pressure loss of the LOCA vent pipe 8 at the time of LOCA. The installation into the dry well 4 needs a PCCS drain tank installed in the dry well 4 for the sake of water sealing, and is thus not able to be employed unless there is room in the dry well 4. The installation into the suppression pool 6 increases the length of the condensate return pipe 21 outside the PCV, and thus has a problem that the possibility of leakage of radioactive materials increases.

One end of the gas vent pipe 22 is led into the wet well 5 and installed to be submerged in the suppression pool 6. The gas vent pipe 22 is installed so that the submerging depth in the suppression pool 6 is smaller than the submerging depth of the topmost ends of the openings of the LOCA vent pipes 8 in the suppression pool 6.

FIG. 13 is a sectional elevational view showing an example of the heat exchanger of the conventional passive containment cooling system. Referring to FIG. 13, the structure of the heat exchanger 16 of the conventional passive containment cooling system 12 will be described by using a horizontal heat exchanger as an example.

In FIG. 13, the outlet plenum 18 is arranged below the inlet plenum 17. A large number of U-shaped heat exchanger tubes 19 are connected to a tube plate 23. The straight portions of the heat exchanger tubes 19 are installed horizontally. FIG. 13 shows only two of the heat exchanger tubes 19 in a simplified manner. The outside of the heat exchanger tubes 19 is filled with the cooling water 14 (see FIG. 11). The inlets of the heat exchanger tubes 19 are opened to the inlet plenum 17. The outlets of the heat exchanger tubes 19 are opened to the outlet plenum 18.

The gas supply pipe 20 is connected to the inlet plenum 17, and supplies a mixed gas of nitrogen, oxygen, steam and the like in the dry well 4 to the inlet plenum 17. The mixed gas is led into the heat exchanger tubes 19. The steam condenses into condensate, which flows out of the outlets of the heat exchanger tubes 19 into the outlet plenum 18 and accumulates in the lower part of the outlet plenum 18.

The condensate return pipe 21 is connected to the lower part of the outlet plenum 18. The condensate return pipe 21 returns the condensate in the outlet plenum 18 into the containment vessel 3 by gravity. The gas vent pipe 22 is connected to the upper part of the outlet plenum 18. Noncondensable gases that do not condense in the heat exchanger tubes 19, such as nitrogen and hydrogen, are discharged from the heat exchanger tubes 19 and accumulate in the upper part of the outlet plenum 18.

The end of the gas vent pipe 22 is led to the suppression pool 6. The noncondensable gases in the outlet plenum 18 pass through the gas vent pipe 22, push down the pool water in the suppression pool 6, are vented into the pool water and then move to the wet well gas phase 7.

Note that the shape of the heat exchanger tubes 19 is not limited to the U shape. There is a structure installing upright heat exchanger tubes 19 with vertical straight tube portions. The inlet plenum 17 is always located above the outlet plenum 18. In such a manner, the condensate condensed in the heat exchanger tubes 19 is led into the outlet plenum 18 by gravity. The advantages of the horizontal type are good seismic performance and effective utilization of the cooling water 14. On the contrary the advantage of the vertical type is high drainability of the condensate.

Next will be described functions of the conventional passive containment cooling system 12 configured as such.

If a loss-of-coolant accident (LOCA) with a break of a piping in the dry well 4 occurs, steam is generated in the reactor pressure vessel 2, which sharply increases the pressure in the dry well 4. The gas (mostly nitrogen and steam) in the dry well 4 passes through the gas supply pipe 20 of the passive containment cooling system 12 and is supplied to the heat exchanger 16.

The noncondensable gases having accumulated in the outlet plenum 18 of the heat exchanger 16 passes through the gas vent pipe 22 and is discharged into the suppression pool 6. The discharge of the noncondensable gases is let by a pressure difference between the dry well 4 and the wet well 5.

At the time of the LOCA, the pressure in the dry well 4 is higher than that in the wet well 5. The discharge of the noncondensable gases is thus performed smoothly. Consequently, the gas in the dry well 4 becomes mostly steam in some time. In such a state, the heat exchanger 16 can efficiently condense the steam in the dry well 4 and return (or circulate) the condensate into the containment vessel 3.

Immediately after the occurrence of the LOCA, a large amount of steam generates from the coolant, and rapid venting of the gas in the dry well 4 to the wet well 5 is mostly performed through the LOCA vent pipes 8.

The steam condenses in the suppression pool 6 while noncondensable nitrogen does not condense in the suppression pool 6 and moves to the wet well gas phase 7. By the rapid venting through the LOCA vent pipes 8, most of the nitrogen in the dry well 4 moves to the wet well 5, for example, in about one minute after the LOCA.

Subsequently, the vent flowrate decreases. Since the submerging depth of the gas vent pipe 22 in the suppression pool 6 is set to be smaller than that of the LOCA vent pipes 8, the gas in the thy well 4 starts to be vented to the wet well 5 through the gas vent pipe 22 in some time after the LOCA.

In such a manner, the vent flowrate subsides and the steam generated in accordance with the decay heat of the core fuel is released from the LOCA break into the dry well 4. It is designed that the steam is led through the gas supply pipe 20 into the heat exchanger 16 for cooling, but not through the LOCA vent pipes.

As a result, because the decay heat of the core fuel is transferred to the outside cooling water 14, the increase of pressure in the containment vessel 3 due to heat up of the water in the suppression pool 6 can be prevented. The passive containment cooling system 12 is thus designed to be able to passively cool the containment vessel 3 without using external power at all.

Next, in the case of a transient event such as a station blackout (hereinafter, may be referred to as "SBO"), the decay heat generated in the core is transferred to the suppression pool 6 by the reactor steam passing through the safety relief valve 72. As the reactor steam condenses in the suppression pool 6, the decay heat is transferred to the pool water and the temperature of the pool water increases gradually. After a lapse of certain time, the pool water is saturated and steam equivalent to the decay heat flows continuously into the wet well, gas phase 7 to pressurize the wet well gas phase 7. This activates the vacuum breakers 9, and the nitrogen and steam in the wet well gas phase 7 flow into the dry well 4. The dry well 4 is thereby pressurized, and the nitrogen and steam in the dry well 4 are led to the heat exchanger 16 of the passive containment cooling system 12 through the gas supply pipe 20, whereby the steam is condensed.

Since the nitrogen, which is a noncondensable gas, simply remains in the heat exchanger 16, the passive containment cooling system 12 stops functioning. The reason is that although the gas vent pipe 22 is led from the heat exchanger 16 to the suppression pool 6, the pressure of the wet well gas phase 7 increases under the SW and so the noncondensable gas in the heat exchanger 16 is not able to be vented to the wet well gas phase region 7.

To solve such a problem, Patent Document 1 discloses a method of providing an outer well 32 outside the dry well 4 and the wet well 5, and leading the gas vent pipe 22 into a water seal pool retained therein to release the noncondensable gas accumulated in the heat exchanger 16 into the outer well 32 (see FIG. 2 of Patent Document 1). The interior of the outer well 32 is inerted by nitrogen in consideration of the prevention of detonation even when hydrogen is vented.

Patent Document 2 discloses a method of connecting the gas supply pipe 20 to the wet well gas phase 7 to directly lead the steam and nitrogen in the wet well gas phase 7 to the heat exchanger 16, and discharging noncondensable gases such as nitrogen accumulated in the heat exchanger into the dry well 4 by using an exhaust fan 24 arranged on the gas vent pipe 22 (see FIG. 2 of Patent Document 2). In either case, the gas supply pipe 20, the condensate return pipe 21, and the gas vent pipe 22 are installed outside the containment vessel 3.

In preparation for a core meltdown in the event of a transient event such as a station blackout (SBO), ABWRs to be built in Europe and the U.S.A. have fusible valves 64 and lower dry well flooder pipes 65 inside the pedestal cavity 61*a*. The lower dry well flooder pipes 65 are extended from the LOCA vent pipes 8 through the wall of the pedestal 61 and connected to the fusible valves 64. The fusible valves 64 and the lower dry well flooder pipes 65 are installed on all the LOCA vent pipes 8. If the temperature of the lower dry well 61*a* reaches approximately 260 degrees Celsius, low melting point plug portions of the fusible valves 64 melt to open. At the time of a core meltdown accident, the corium melts the bottom of the reactor pressure vessel 2 through and falls into the pedestal cavity 61*a*. This increases the temperature in the pedestal cavity 61*a* abruptly, and the fusible valves 64 open and the cooling water in the LOCA vent pipes 8 flows into the pedestal cavity 61*a* through the lower dry well. flooder pipes 65 to flood and cool the corium.

Other examples of the valves for pouring water on the fallen high-temperature corium with the same purpose as that of the fusible valves 64 include squib valves and spring valves. ESBWRs (Economic Simplified Boiling Water Reactors) use squib valves. EPRs (European Pressurized Reactors) use spring valves. A large amount of steam generated at that time flows into an upper dry well from openings 66 in the LOCA vent pipes 8, passes through the gas supply pipe 20, and is led to the heat exchanger 16 of the passive containment cooling system 12 for condensation. Meanwhile, the noncondensable gases accumulated in the heat exchanger 16 are vented into the wet well 5 through the gas vent pipe 22. In such a state, the pressure in the dry well 4 is higher than that in the wet well 5, so that the noncondensable gases are efficiently vented to the wet well gas phase 7. The condensate returns to a LOCA vent pipe 8 through the condensate return pipe 21, passes through the lower dry well flooder pipe 65, and is used to cool the corium again.

In addition, the pool water in the LOCA vent pipes 8 is also supplied from the suppression pool 6 through the horizontal vent pipes 8*a*.

The fusible valves 64 and the lower dry well flooder pipes 65 described above have had a problem; that is, if the pressure in the dry well 4 increases after the fusible valves 64 are opened, the high-temperature water pooled in the lower dry well 61*a* flows back into the suppression pool 6 to increase the temperature of the suppression pool water. Backflow prevention measures have been difficult to be implemented because the temperature of the portions of the lower dry well flooder pipes 65 in the lower dry well 61*a* become so high at the time of an accident that it is difficult to expect devices to function. The installation of devices inside the LOCA vent pipes 8 is also difficult since they interfere with the safety function of the vent pipes. Hence, the prevention measures were difficult.

FIG. 4 of Patent Document 2 discloses a method for leading the condensate condensed in the heat exchanger 16 to a PCCS drain tank 76 by the condensate return pipe 21. It is further disclosed to provide an overflow pipe 77 on the gas phase region of the PCCS drain tank 76 to return overflow water into the containment vessel 3. However, the condensate return pipe 21, the PCCS drain tank 6, and the overflow pipe 77 are all installed outside the containment, vessel 3, and radioactive materials may possibly leak from such devices to the outside environment.

Patent Document 3 discloses a method for providing a PCCS drain tank in the dry well and injecting cooling water in the PCCS drain tank into the containment vessel by gravity by using an injection pipe. However, according to such a method, the PCCS drain tank is installed in the dry well. In the case of the RCCV used for the ABWR, there no room to spare and the method has been impossible to be implemented.

Next, a conventional filtered venting system will be described with reference to FIG. 14. A filtered venting system 50 has been employed in European nuclear power plants after the accident at the Chernobyl nuclear power plant.

FIG. 14 is a sectional elevational view showing a design example of the conventional filtered venting system. The filtered venting system 50 includes a filtered venting tank 51 storing decontamination water 52, an inlet pipe 53 for leading gas in the containment vessel 3 to the decontamination water 3, and an outlet pipe 54 for releasing gas in the gas phase region of the filtered venting tank 51 to the environment. The upper portion of the outlet pipe 54 passes through a stack 75.

The installation location of the filtered venting tank 51 and the like is not limited to inside the building. If the filtered venting tank 51 and the like are installed in an existing reactor as a backlit, the filtered venting tank 51 and the like are often installed outside the nuclear reactor building. If installed from the beginning of construction, the filtered venting tank 51 and the like may be installed inside the nuclear reactor building and the like.

A Venturi scrubber 55 may be installed in the decontamination water 52 so that the gas led from the inlet pipe 53 passes through the Venturi scrubber 55. However, the Venturi scrubber 55 is not indispensable. A metal fiber filter 56 may be installed in the gas phase region of the filtered venting tank 51, although the metal fiber filter 56 is not indispensable.

FIG. 14 shows a case in which both the Venturi scrubber 55 and the metal fiber filter 56 are installed. For example, one isolation valve 57 is installed on the inlet pipe 53. A rupture disc 58 is arranged in parallel with the isolation valve 57, and normally-opened isolation valves 59*a* and 59*b* are arranged in front of and behind the rupture disc 58. Two isolation valves 57 may be connected in series.

An outlet valve 60 is installed, though not indispensable, on the outlet pipe 54. A rupture disc is often used instead of a motor-driven valve, in the conventional filtered venting system, one end of the inlet pipe 53 is directly connected to the containment vessel 3 to take in the gas inside the containment vessel 3. The filtered venting system can efficiently remove particulate radioactive materials, such as CsI, with a DF (Decontamination Factor) of approximately 1,000 to 10,000. However, because the conventional filtered venting system cannot remove radioactive noble gases or organic iodine, those radioactive materials are released to the environment through the outlet pipe 54 when it is activated.

The filtered venting tank 51 of the conventional filtered venting system has a limited size, often with a decontamination water (scrubbing water) capacity of no more than 100 m$^3$. If radioactive materials are removed, the decontamination water 52 thus evaporates and decreases due to the heat generated by the radioactive materials. In the event of an actual severe accident, the decontamination water has therefore needed to be replenished from outside.

For powder separators, a cyclone separator by M. O. Morse (1886) has been widely used in sawmills, oil refining facilities, etc. A cyclone separator is an application of the principle of a centrifugal separator. A solid-containing liquid or gas is made to flow circumferentially into a funnel-like or cylindrical cyclone to trace a spiral by the flow of the gas or liquid. The gas or liquid is discharged upward from the center of the circle of the cyclone. The solid is centrifugally separated, collides with the wall surface, then falls by gravity, and accumulates below. With such a mechanism, the gas or liquid are discharged from the center of the circle after most of the solid components are removed. To collect the separated solid components, a collection container is often arranged under the cyclone. As the speed of the fluid flowing in from the inlet increases, the centrifugal force increases and the removal efficiency of the cyclone separator improves.

CITATION LIST

Patent Documents

Patent Document 1: Japanese Patent Application Laid-Open Publication No. 2014-10080
Patent Document 2: Japanese Patent Application Laid-Open Publication No. 2014-81219
Patent Document 3: Japanese Patent Application Laid-Open Publication No. 2004-333357

SUMMARY OF THE INVENTION

Problems to be Solved by the Invention

In the conventional passive containment cooling system, the heat exchanger is installed to be submersed in the cooling water pool, and the other pipes and devices are installed outside the containment vessel. If all the pipes and devices are installed inside the containment vessel, the containment vessel would become large in size. It has been difficult to install the pipes and devices inside a small-sized RCCV of an ABWR. Since the pipes and devices are installed outside the containment vessel to cool the containment vessel, there has been a possibility of leakage of radioactive materials from the pipes and the devices.

In particular, since radioactive cesium iodide (CsI) concentrates in the condensate, there has been a possibility of a leakage of a large amount of radioactive materials if the condensate leaks from the condensate return pipe and the PCCS drain tank containing the condensate.

The gas vent pipe contains a large amount of radioactive noble gases, organic iodine, and hydrogen. As a result, there has been a possibility of a leakage of a larger amount of radioactive materials and hydrogen if the gas vent pipe is installed outside the containment vessel. This has caused a risk of hydrogen detonation. Furthermore, since the gas vent pipe also contains CsI, CsI needs to be reliably removed if the exit of the gas vent pipe is outside the dry well or the wet well.

As described above, though the conventional passive containment cooling system has the function of cooling the containment vessel, it has had a problem of inadequate function of controlling the leakage of radioactive materials and hydrogen.

Moreover, the conventional passive containment cooling system has the following problem; that is, in the event of pressure increase in the wet well during a station blackout (SBO) and the like, the method for directly sucking in the gas front the wet well gas phase needs an exhaust fan using a power source to vent the noncondensable gases. This decreases the advantage of the passive safety system that the system can function even in an SBO.

Furthermore, in the conventional passive containment cooling system, the gas supply pipe 20 is always open to the interior of the dry well 4. As a result, there has been a possibility that loose parts such as fragments of heat insulation material scattered into the dry well 4 at the time of an abrupt blowdown under a LOCA can be sucked into the heat exchanger 16 and clog the heat exchanger tubes 19.

The conventional filtered venting system has a characteristic of removing particulate radioactive materials such as CsI efficiently but releasing a large amount of radioactive noble gases and organic iodine to the environment. Therefore, it has been a problem that although land contamination by CsI can be prevented, the venting cannot be performed until the resident have completely evacuated.

The conventional containment vessel of a pressure suppression type is downsized and efficiently designed. On the other hand, if a large amount of hydrogen is generated by the oxidation of fuel cladding tubes at the time of a severe accident, the pressure of the containment vessel can increase beyond the designed pressure. The reason is that, unlike steam, hydrogen is noncondensable and thus cannot be removed by the suppression pool or by the passive containment cooling system. In such a case, there has been a possibility that part of the hydrogen leaks from the containment vessel and detonates outside.

If the filtered venting system 50 is activated, the gas in the containment vessel 3 is discharged to the filtered venting tank 51. As a result, the gas supply pipe 20 of the passive containment cooling system 12 cannot supply the gas in the containment vessel 3 to the heat exchanger 16.

The condensate is therefore unable to flow back into the containment vessel 3, and water injection into the containment vessel 3 needs to be continued from an outside water source. For example, if a residual heat removal system becomes unrecoverable because of a giant tsunami, the water injection from an outside water source needs to be continued for a long period. On the other hand, if the passive containment cooling system is operated alone without the activation of the filtered venting system, there has been a problem that radioactive materials in the containment vessel 3 are not removed and leak out of the containment vessel 3 to the environment at a design leakage rate. The passive containment cooling system has the excellent advantage of being able to cool the containment vessel 3 even if a core meltdown occurs due to a station blackout (SBO), while an active containment spray system cannot. However, there has been a problem of lacking the function of the active containment spray system of removing radioactive materials in the containment vessel 3.

Consequently, it is an important challenge to enable the cooling of the containment vessel 3 by the passive containment cooling system 12 to eliminate the need for the water injection from an outside water source even if the filtered venting system 50 is activated to remove the radioactive materials.

It is thus an object of an embodiment of the present invention to provide a passive containment cooling and filtered venting system and a nuclear power plant which can suppress leakage of radioactive materials and cool the containment vessel even if a severe accident accompanied by a core meltdown occurs due to a station blackout (SBO) and the like.

Means for Solving the Problems

According to an embodiment of the present invention, there is provided a passive containment cooling and filtered venting system of a nuclear power plant, the plant including: a core, a reactor pressure vessel that accommodates the core, a containment vessel including: a dry well that contains the reactor pressure vessel, a wet well that contains in its lower portion a suppression pool connected to the dry well via a LOCA vent pipe and includes in its upper portion a wet well gas phase, and a vacuum breaker that circulates gas in the wet well gas phase to the dry well, and a pedestal that supports the reactor pressure vessel in the containment vessel via an RPV skirt and forms a pedestal cavity inside, the passive containment cooling and filtered venting system comprising: an outer well that is arranged outside the dry well and the wet well, adjoins the dry well via a dry well common part wall, adjoins the wet well via a wet well common part wall, and has pressure resistance and gastightness equivalent to pressure resistance and gastightness of the dry well and the wet well; a scrubbing pool that is arranged in the outer well and stores water inside; a cooling water pool that is installed above the dry well and the outer well and reserves cooling water; a heat exchanger that includes an inlet plenum, an outlet plenum, and a heat exchanger tube, and is submerged at least in part in the cooling water; a gas supply pipe that is connected to the inlet plenum of the heat exchanger at one end and connected to a gas phase of the containment vessel at other end to lead gas in the containment vessel to the heat exchanger; a condensate return pipe that is connected to the outlet plenum of the heat exchanger at one end, passes through the outer well, and is connected to inside the containment vessel at other end to lead condensate in the heat exchanger into the containment vessel; and a gas vent pipe that is connected to the outlet plenum of the heat exchanger at one end, passes through the outer well, has other end installed as submerged in the scrubbing pool in the outer well, and releases noncondensable gas in the heat exchanger to the outer well.

According to another embodiment of the present invention, there is provided a nuclear power plant comprising: a containment vessel that contains a reactor pressure vessel; an outer well that is arranged outside the containment vessel and has pressure resistance and gastightness; a scrubbing pool that is arranged in the outer well and stores water inside; a cooling water pool that is installed above the dry well and the outer well and reserves cooling water, a heat exchanger that includes an inlet plenum, an outlet plenum, and a heat exchanger tube, and is submerged at least in part in the cooling water; a gas supply pipe that is connected to the inlet plenum of the heat exchanger at one end and connected to a gas phase of the containment vessel at other end to lead gas in the containment vessel to the heat exchanger; a condensate return pipe that is connected to the outlet plenum of the heat exchanger at one end, passes through the outer wall, and is connected to inside the containment vessel at other end to lead condensate in the heat exchanger into the containment vessel; and a gas vent pipe that is connected to the outlet plenum of the heat exchanger at one end, passes through the outer well, has other end installed as submerged in the scrubbing pool in the outer well, and releases noncondensable gas in the heat exchanger to the outer well.

Advantage of the Invention

According to an embodiment of the present invention, even if a severe accident accompanied by a core meltdown occurs due to a station blackout (SBO) and the like, leakage of radioactive materials can be suppressed and the containment vessel can be cooled.

EMBODIMENTS OF THE INVENTION

Figure 1:
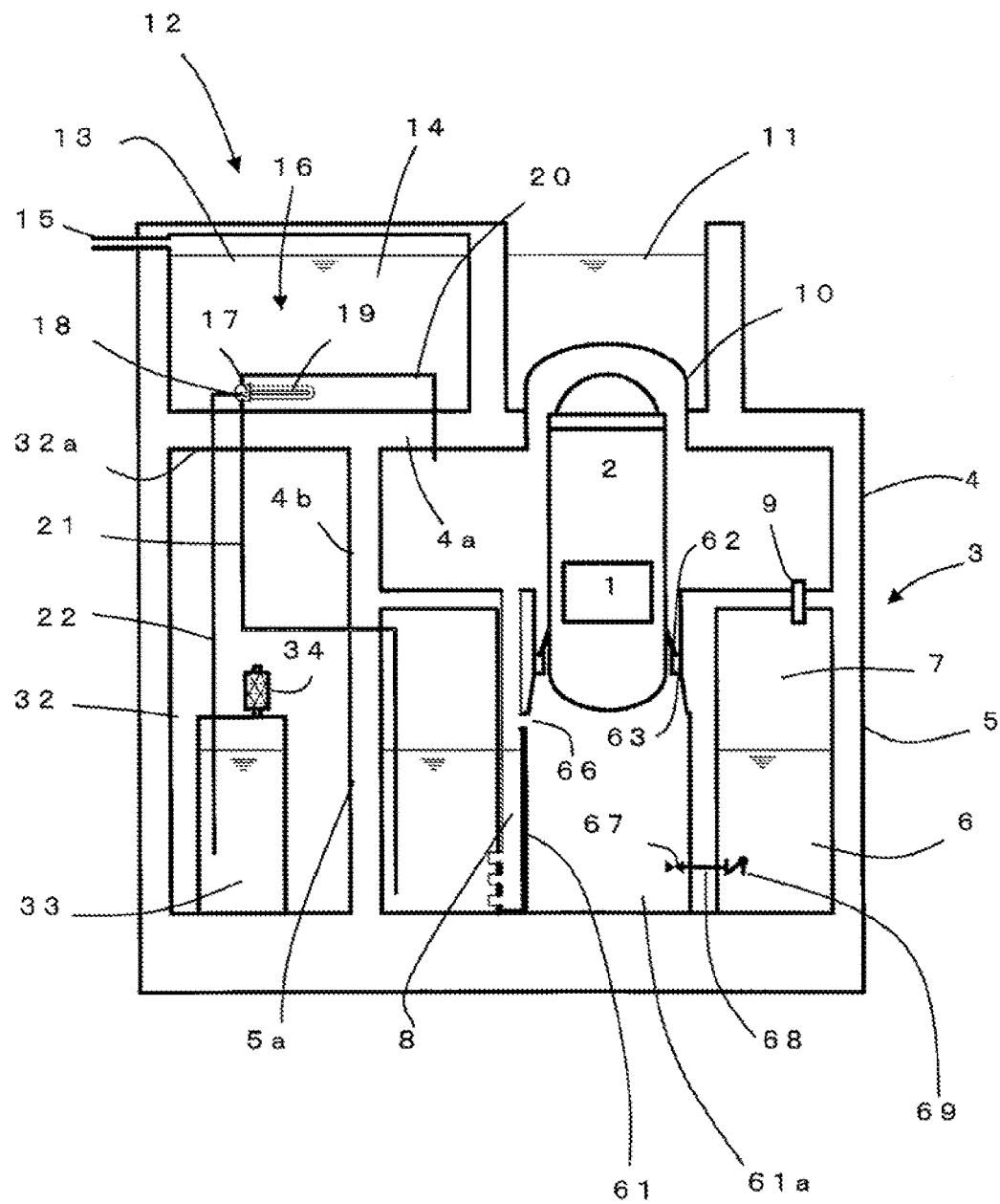
FIG. 1 is a sectional elevational view showing a configuration around a containment vessel of a nuclear power plant according to a first embodiment of the present invention.

A passive containment cooling and filtered venting system and a nuclear power plant using the same according to embodiments of the present invention will be described below with reference to FIGS. 1 to 10. The same or similar parts as/to those of the foregoing conventional techniques, and the same or similar parts between the following embodiments, will be designated by the same reference numerals. Redundant descriptions will be omitted, and only essential parts will be described.

First Embodiment

Figure 2:
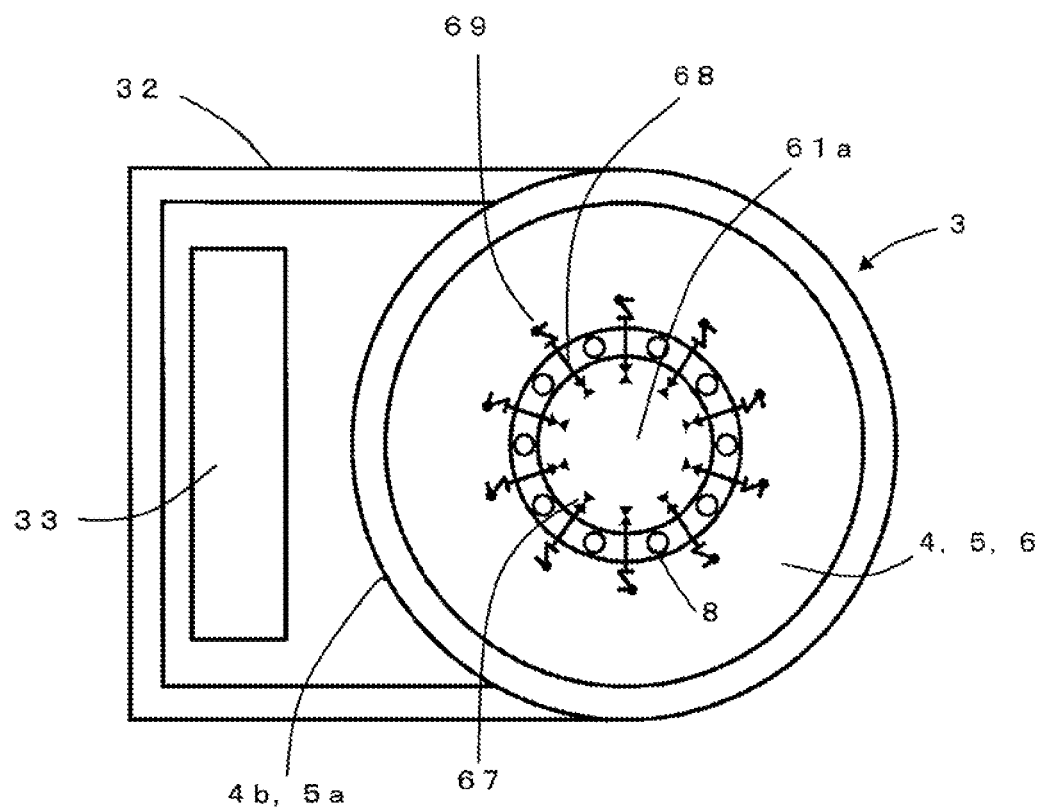
FIG. 2 is a plan view showing the configuration around the containment vessel of the nuclear power plant according to the first embodiment of the present invention.

FIG. 1 is a sectional elevational view showing a configuration around a containment vessel of a nuclear power plant according to a first embodiment of the present invention. FIG. 2 is a plan view showing the configuration around the containment vessel of a nuclear power plant according to the first embodiment of the present invention. The embodiment shown in FIGS. 1 and 2 uses a containment vessel called RCCV, whereas the type of the containment vessel is not limited to an RCCV. The embodiment is universally applied to all containment vessels of pressure suppression type having a pressure suppression function using a suppression pool. Other materials such as an SC composite and steel may also be used.

In FIG. 1, a core 1 is contained in a reactor pressure vessel 2. The reactor pressure vessel 2 is contained in a containment vessel 3. The containment vessel 3 has a cylindrical shape (see FIG. 2).

The interior of the containment vessel 3 is partitioned into a dry well 4, which contains the reactor pressure vessel 2, and a wet well 5. The dry well 4 and the wet well 5 each constitutes a part of the containment vessel 3. The wet well 5 forms a suppression pool 6 inside. A wet well gas phase 7 is formed above the suppression pool 6. The outer wall parts of the dry well 4 and the wet well 5 are integrated to constitute a cylindrical outer wall part of the containment vessel 3. The ceiling part of the dry well 4 is a flat plate, which will be referred to as a top slab 4a of the dry well 4. The atmosphere in the containment vessel 3 is inerted by nitrogen.

In the present embodiment, an outer well 32 is provided outside the dry well 4 and the wet well 5. The outer well 32 adjoins the dry well 4 via a dry well common part wall 4b, and adjoins the wet well 5 via a wet well common part wall 5a. The ceiling part of the outer well 32 is a flat plate, which will be referred to as a top slab 32a of the outer well 32. The atmosphere in the outer well 32 is inerted by nitrogen. The outer well 32 has pressure resistance and gastightness equivalent to those of the dry well 4 and the wet well 5.

The same materials as those of the containment vessel 3 may all be used for the outer well 32, such as reinforced concrete (RC), an SC composite, and steel. In the case of reinforced concrete, liners are laid on the inner surfaces as with the containment vessel 3. As shown in FIG. 2, the outer well 32 according to the present embodiment has a rectangular shape in a top plan view and is configured to surround a part of the outer walls of the dry well 4 and the wet well 5. However, the plane shape of the outer well 32 is not limited thereto. The outer well 32 may have any shape as long as the outer well 32 adjoins and surrounds at least a part of the outer walls of the dry well 4 and the wet well 5. Examples may include a trapezoidal shape, a polygonal shape, a crescent shape, a partial annular shape, and a full annular shape.

A scrubbing pool 33 storing water inside is arranged in the outer well 32. A lid 33a covers the top of the scrubbing pool 33 (see FIG. 3). A space 33b is formed between the lid 33a and the pool water. A first outlet pipe 33c opening to the space 33b is arranged on the top of the lid 33a. A metal fiber filter (filter) 34 is connected to and arranged on one end of the first outlet pipe 33c. The metal fiber filter 34 is further connected with a second outlet pipe 34a which opens to the interior of the outer well 32 at the other end.

Figure 3:
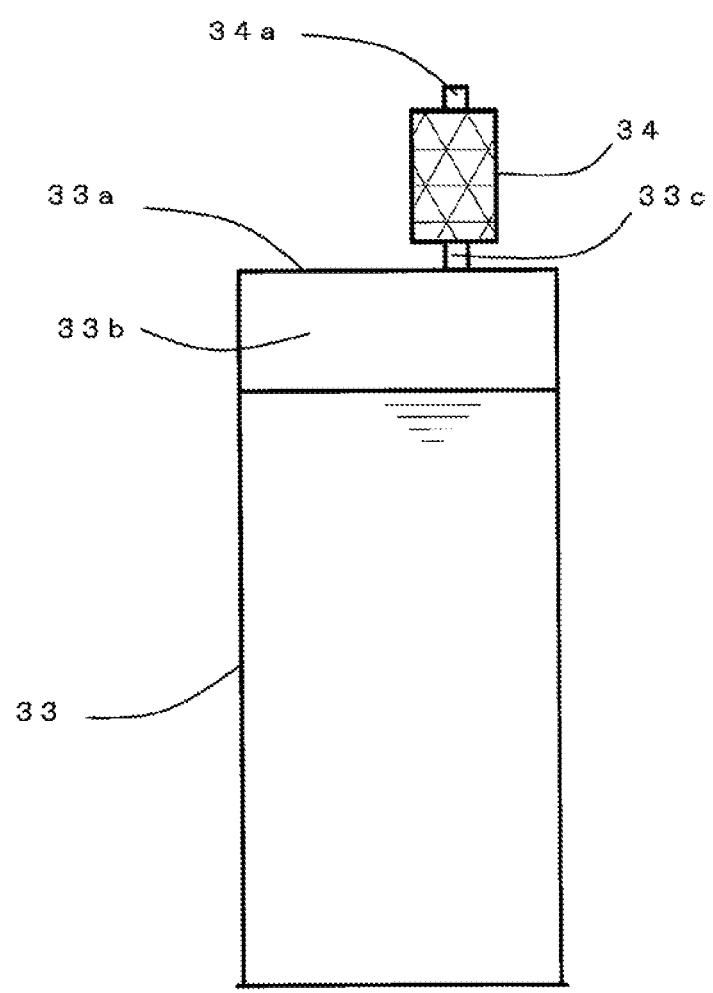
FIG. 3 is an elevational view showing a configuration around a scrubbing pool of the nuclear power plant according to the first embodiment of the present invention.

FIG. 3 shows a detailed configuration around the scrubbing pool 33 and the metal fiber filter 34. The space 33b is needed if the water level rises as the gas in the dry well 4 is vented from the gas vent pipe 22. The lid 33a is needed to prevent the water from flowing out due to sloshing at the time of an earthquake.

While only one metal fiber filter 34 is shown in the drawings, a plurality of metal fiber filters 34 may be installed. For example, four PCCS heat exchangers 16, four gas vent pipes 22, and four metal fiber filters 34 may be installed. Alternatively, four PCCS heat exchangers 16 may be installed with two integrated gas vent pipes 22 and two metal fiber filters 34. The scrubbing pool 33, the lid 33a, and the space 33b may be configured as an integral tank.

As shown in FIG. 1, a cooling water pool 13 is arranged above the containment vessel 3 and the outer well 32. The cooling water pool 13 stores cooling water 14 inside. The cooling water pool 13 may be of either a pool type or a tank type. FIG. 1 shows one of a pool type. In the case of the pool type, the top of the cooling water pool 13 is covered with a lid. An exhaust port 15 for releasing steam to the environment is arranged on the gas phase in the upper part of the cooling water pool 13.

A heat exchanger 16 is installed in the cooling water pool 13. The heat exchanger 16 is installed to be submerged at least in part in the cooling water 14. The present embodiment describes an example where the heat exchanger 16 is completely submerged in the cooling water 14. A gas supply pipe 20 is connected to the inlet plenum 17 of the heat exchanger 16. In the present embodiment, the gas supply pipe 20 passes through the top slab 32a of the containment vessel 3, and the other end of the gas supply pipe 20 opens in the dry well 4.

A condensate return pipe 21 is connected to the lower part of the outlet plenum 18 of the heat exchanger 16. The condensate return pipe 21 is installed to pass through the top slab 32a of the outer well 32 and the interior of the outer well 32 so that its tip is submerged in the suppression pool 6 in the wet well 5. In such a structure, the condensate return pipe 21 is installed to pass through the interior of the outer well 32, and the condensate is prevented from leaking out to directly release radioactive materials such as CsI to the environment.

If a core meltdown accident occurs, the atmosphere in the dry well 4 contains a large amount of particulate radioactive materials such as CsI. Most of the particulate radioactive materials such as CsI transfer to the condensate when the steam condenses in the heat exchanger 16. The condensate containing a large amount of CsI is circulated to and retained in the pool water of the suppression pool 6 via the condensate return pipe 21. The passive containment cooling and filtered venting system according to the present embodiment is thus configured to passively remove the particulate radioactive materials floating in the containment vessel 3.

Consequently, according to the present embodiment, even if a core meltdown accident occurs due to a station blackout (SBO), an effect equivalent to as if the particulate radioactive materials are removed by an active containment vessel spray and circulated to the pool water of the suppression pool 6 is obtained. The structure that the condensate return pipe 21 is not installed in a LOCA vent pipe 8 will not increase the pressure loss of the LOCA vent pipe at the time of a LOCA.

Moreover, the gas vent pipe 22 is connected to the upper part of the outlet plenum 18 of the heat exchanger 10. The gas vent pipe 22 is installed to pass through the top slab 32a of the outer well 32 and the interior of the outer well 32, with its tip submerged into the pool water of the scrubbing pool 33. In such a structure, since the gas vent pipe 22 is thus installed to pass through the interior of the outer well 32, the gas is prevented from leaking out to directly release radioactive materials such as radioactive noble gases, organic iodine, and CsI to the environment. Of these, particulate radioactive materials such as CsI are removed by the pool water of the scrubbing pool 33. The metal fiber filter 34 is configured to further remove particulate radioactive materials carried over to water droplets and the like.

This can eliminate the need to have surrounding habitants move to other places for a long period of time because of the contamination of the land by particulate radioactive materials such as CsI released to the environment. The radioactive noble gases and organic iodine are released from the second outlet pipe 34a into the outer well 32 and retained in the outer well 32. This can eliminate the need to have surrounding habitants evacuate in advance or take iodine tablets due to direct release of radioactive noble gases and organic iodine to the environment when a conventional filtered venting system is in operation.

In the present embodiment, a large amount of hydrogen generated at the time of a severe accident is also released into the outer well 32 through the gas vent pipe 22. The pressure of the dry well 4 and the wet well 5 at the time of the severe accident can thus be maintained to a sufficiently low level. Since the atmosphere in the outer well 32 is inerted by nitrogen, the confinement of the large amount of hydrogen will not cause detonation.

In the present embodiment, a flooder pipe 68 for flooding the lower dry well is provided through the wall of the pedestal 61. The flooder pipe 68 is led into the lower dry well (pedestal cavity) 61a at one end, and opens in the suppression pool 6 at the other end. A flooder valve 67 is arranged on the portion of the flooder pipe 68 inside the lower dry well 61a. A check valve (flooder check valve) 69 is arranged on the portion of the flooder pipe 68 inside the suppression pool 6. The provision of the check valve 69 can prevent high-temperature water in the lower dry well 61a from flowing back to the suppression pool 6, even if the pressure in the dry well 4 increases. Since the check valve 89 is located in the suppression pool 6, the safety functions of the LOCA vent pipes 8 at the time of an accident will not be hampered. A total of ten flooder pipes 68 are installed to not overlap with the LOCA vent pipes 8, for example, in intermediate positions between the LOCA vent pipes (see FIG. 2).

The flooder valves 67 may be the same type of fusible valves as in the conventional plants. Aside from fusible valves, any valves that do not need an operating power source at the time of an SBO can be used. For example, squib valves which use an, explosive for operation may be employed. Spring valves which use spring force for operation may also be employed. For improved reliability, five of the ten flooder valves may be squib valves and the other five may be spring valves. Otherwise, five may be fusible valves and the other five may be squib valves. At least two or more types among fusible, squib, and spring valves may be used in combination.

Second Embodiment

Figure 4:
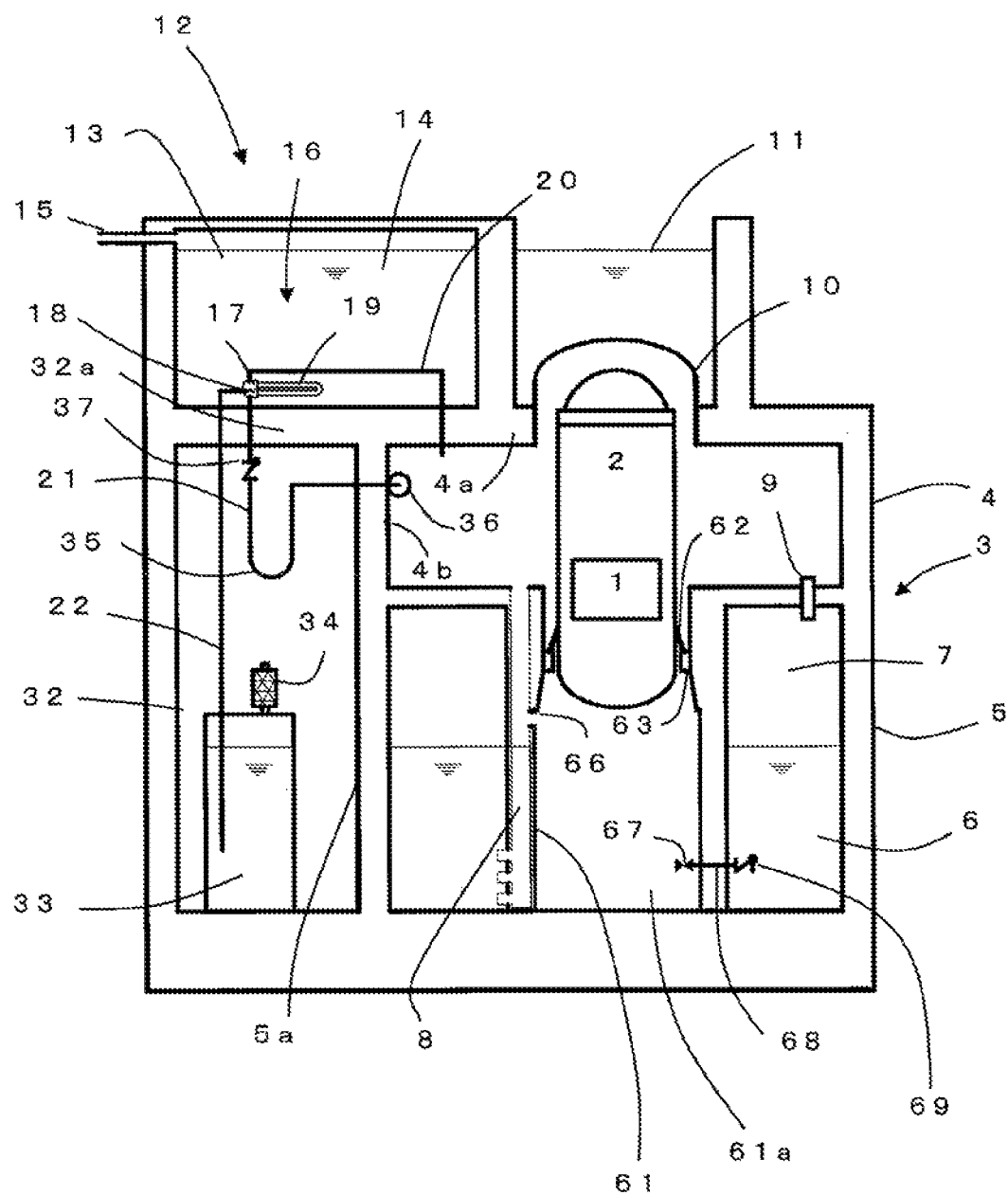
FIG. 4 is a sectional elevational view showing a configuration around a containment vessel of a nuclear power plant according to a second embodiment of the present invention.

FIG. 4 is a sectional elevational view showing a configuration around a containment vessel of a nuclear power plant according to a second embodiment of the present invention.

In the present embodiment, the condensate return pipe 21 includes a U-bent portion (referred to as a "U-shaped water seal") 35 and is led into the dry well 4 through the dry well common part wall 4b. The U-shaped water seal 35 stores water inside. A spray sparger 36 is arranged at the end of the condensate return pipe 21 inside the dry well 4. In FIG. 4, the spray sparger 36 is shown to be in contact with the side wall of the dry well 4. However, the spray sparer 36 is not limited to such a position. For example, the spray sparger 36 may be attached to the ceiling of the dry well 4. The spray sparger 36 may be attached to the top slab 4a of the dry well 4, since a flow occurs by gravity as long as the spray sparger 36 is located inside the dry well 4 in a position lower than the outlet plenum 18 of the heat exchanger 16. A check valve (condensate check valve) 37 is arranged on a portion of the condensate return pipe 21 between the heat exchanger 16 and the U-bent portion (U-shaped water seal) 35. The check valve 37 is installed in a direction of preventing a backflow from the U-bent portion (U-shaped water seal) 35 to the heat exchanger 16. The rest of the configuration is the same as that of the first embodiment.

In the present embodiment having such a configuration, the condensate can be sprayed into the dry well 4. The dry well 4 can thus be maintained at low temperature. If a core meltdown accident occurs with a LOCA as an initiator, radioactive materials such as CsI released from the core fuel would be released from a break in the piping into the dry well 4 and deposit in the dry well 4. Decay heat occurring from the deposited radioactive materials increases the temperature in the dry well 4. If the situation is left without any countermeasures, the containment vessel 3 can be damaged from overheating.

In the present embodiment, the condensate sprayed into the dry well 4 can limit the interior of the dry well 4 to low temperatures and passively prevent the containment vessel from overheating and damage. The provision of the spray sparger 36 can make the injected water into drops for a higher heat removal effect. The presence of the U-shaped water seal 35 can prevent the gas in the dry well 4 from flowing back through the condensate return pipe 21, bypassing the heat exchanger tubes 19, and being vented into the scrubbing pool 33 through the gas vent pipe 22. The check valve 37 can further ensure the prevention of the backflow.

Third Embodiment

Figure 5:
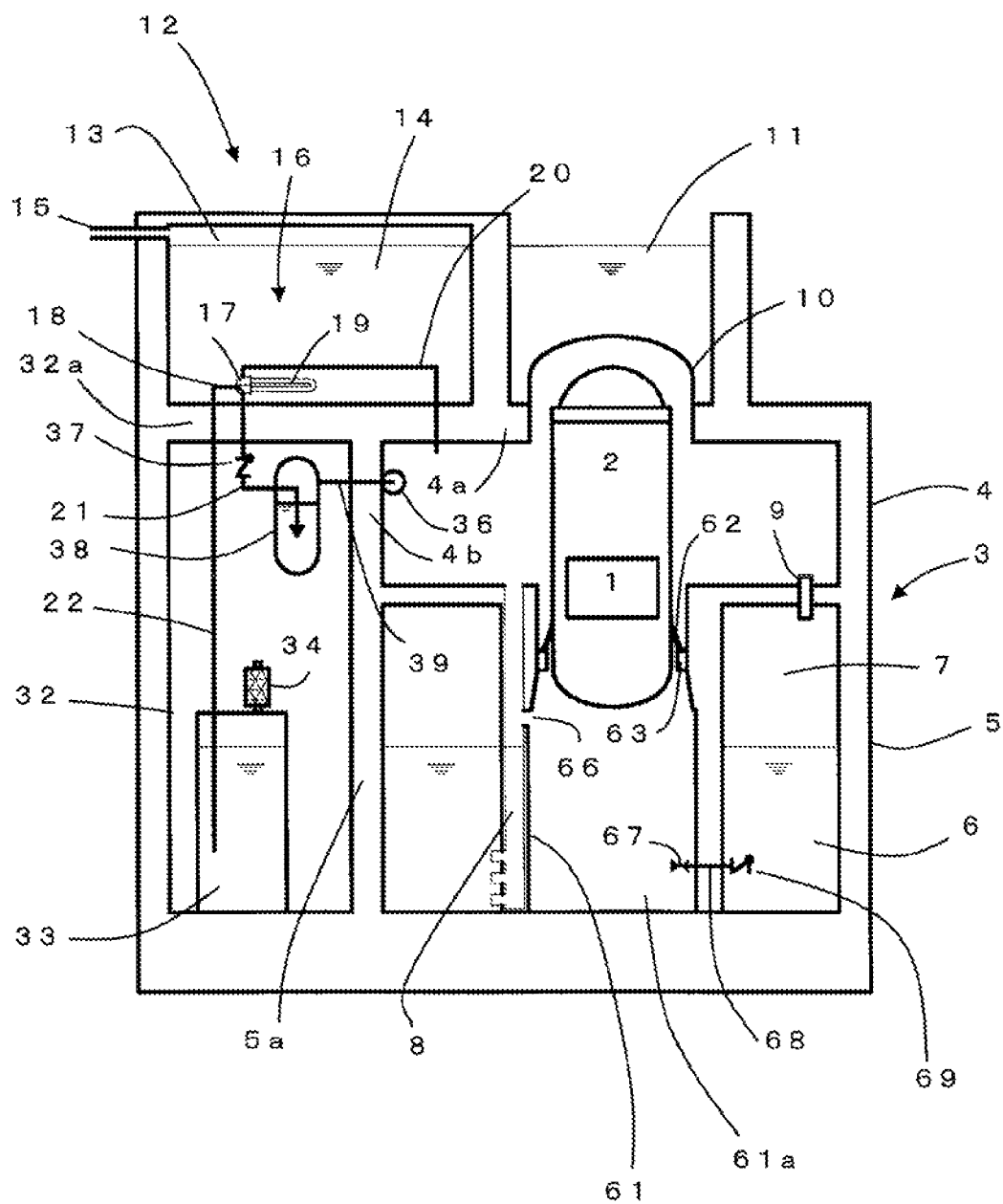
FIG. 5 is a sectional elevational view showing a configuration around a containment vessel of a nuclear power plant according to a third embodiment of the present invention.

FIG. 5 is a sectional elevational view showing a configuration around a containment vessel of a nuclear power plant according to a third embodiment of the present invention.

In the present embodiment, a PCCS drain tank 38 is arranged in the outer well 32. The PCCS drain tank 38 stores sealing water inside and has a gas phase above. An overflow pipe 39 is provided from the gas phase to the interior of the dry well 4. A spray sparger 36 is arranged at the end of the overflow pipe 39. One end of the condensate return pipe 21 is submerged in the water in the PCCS drain tank 38. A check valve (condensate check valve) 37 is arranged on the condensate return pipe 21 to prevent the water from flowing back from the PCCS drain tank 38 to the heat exchanger 16. A water level sensor (not shown) is provided for measuring the water level in the PCCS drain tank 38. The rest of the configuration is the same as that of the second embodiment.

The present embodiment having such a configuration can provide a larger amount of sealing water compared to the U-shaped water seal 35 (FIG. 4). The large amount of sealing water can increase the water head against reverse pressure in the condensate return pipe 21 in the event of a backflow. Since the PCCS drain tank 38 is accommodated in the outer well 32, radioactive materials, such as CsI, contained in the condensate will not directly leak out to the environment.

Consequently, even if the core fuel is damaged and radioactive materials and hydrogen are generated under a station blackout situation, the release to the environment and the detonation of the hydrogen can be prevented. In addition, a failure of the containment vessel by overheating can be prevented even if the state of a severe accident lasts long.

Fourth Embodiment

Figure 6:
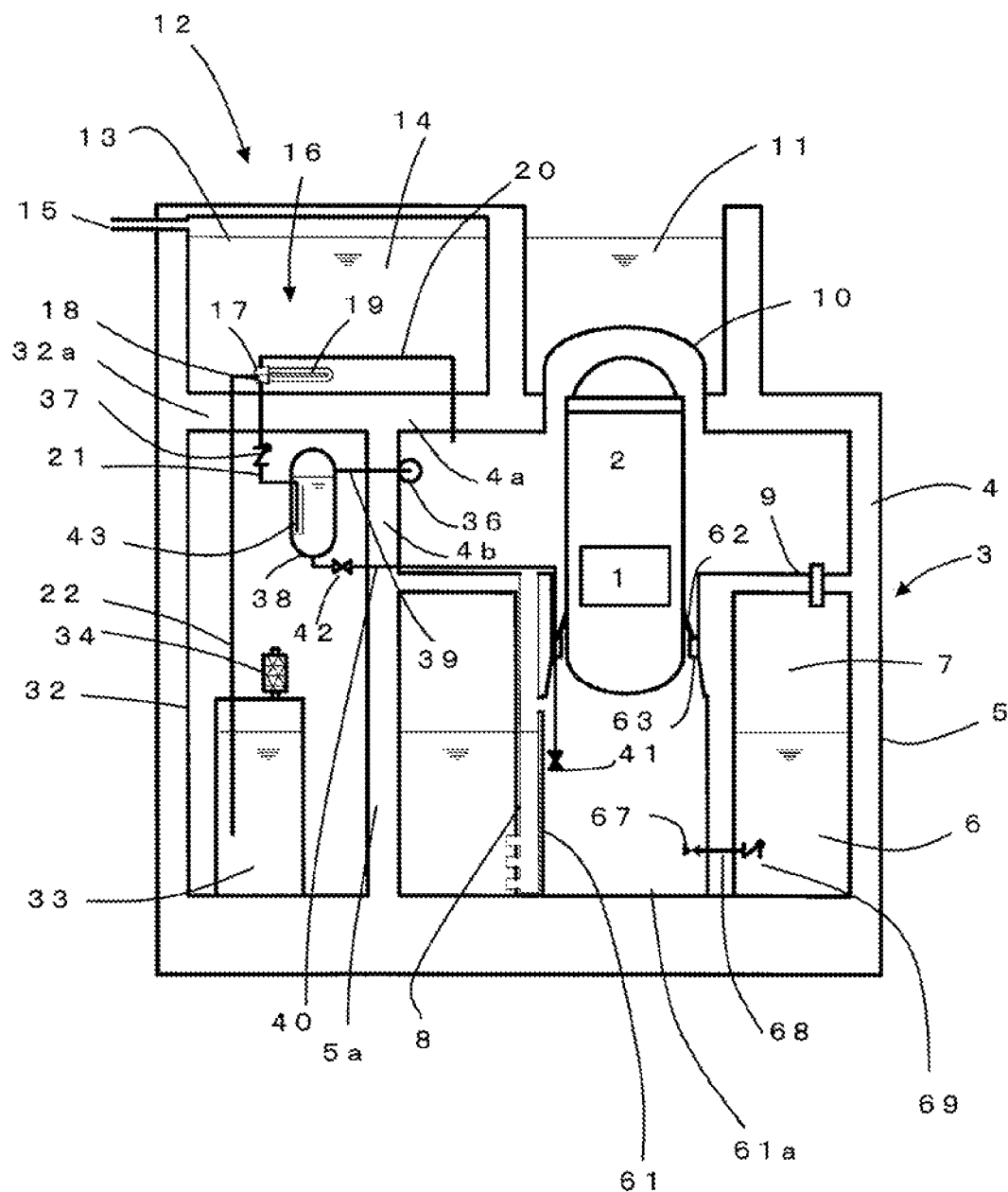
FIG. 6 is a sectional elevational view showing a configuration around a containment vessel of a nuclear power plant according to a fourth embodiment of the present invention.

FIG. 6 is a sectional elevational view showing a configuration around a containment vessel of a nuclear power plant according to a fourth embodiment of the present invention.

In the present embodiment, a water injection pipe 40 is connected from the lower part of the PCCS drain tank 38 to inside the pedestal cavity 61a. A water injection valve 41 is arranged on the portion of the water injection pipe 40 inside the pedestal cavity 61a. A master valve 42 is arranged on the portion of the water injection pipe 40 inside the outer well 32. The master valve 42 is normally open. In the PCCS drain tank 38, a drain pit 43 is arranged storing water inside. One end of the condensate return pipe 21 is submerged in the water in this drain pit 43. The water injection valve 41 may be any one of a fusible valve, a squib valve, and a spring valve. A plurality of such valves may be used in combination in parallel. The rest of the configuration is the same as that of the third embodiment.

According to the present embodiment, by opening the water injection valve 41 it is possible to inject the water stored in the PCCS drain tank 38 into the lower dry well 61a by gravity. As a backup for situations where the flooder valves 67 fail to open due to multiple failures, the water in the PCCS drain tank 38 can be used to cool the corium that has fallen into the lower dry well (pedestal cavity) 61a.

Even if the water in the PCCS drain tank 38 is used for water injection and the water level drops, the water in the drain pit 43 remains. The function for water-sealing the condensate return pipe 21 is thus maintained. The condensate is constantly supplied from the condensate return pipe 21 to the drain pit 43 and overflows into the PCCS drain tank 38. This enables the PCCS drain tank 38 to continue cooling the corium via the water injection pipe 40.

The steam to be supplied to the heat exchanger 16 of the PCCS 12 is generated by the water injected from the PCCS drain tank 38 being heated by the corium in the lower dry well 61a. In other words, according to the present embodiment, the generation of the steam and the supply of the condensate continue in circulation while the heat in the containment vessel is transferred from the heat exchanger 16 of the PCCS 12 to the cooling water 14 and further released into the air from the exhaust port 15.

Fifth Embodiment

Figure 7:
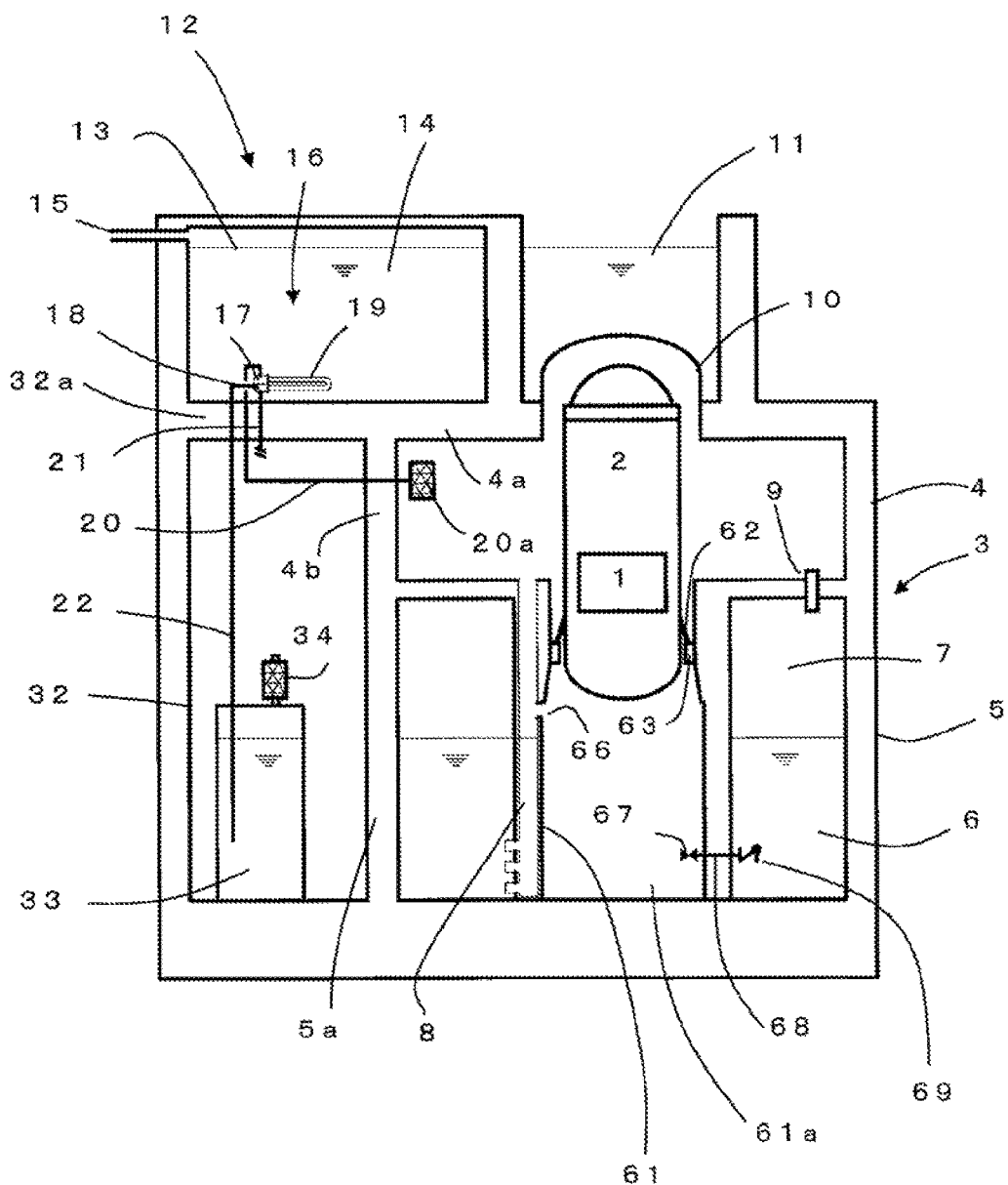
FIG. 7 is a sectional elevational view showing a configuration around a containment vessel of a nuclear power plant according to a fifth embodiment of the present invention.

FIG. 7 is a sectional elevational view showing a configuration around a containment vessel of a nuclear power plant according to a fifth embodiment of the present invention.

In the present embodiment, the gas supply pipe 20 is configured to be connected to the inlet plenum 17 of the heat exchanger 16 at one end, passes through the outer well 32, and is connected into the dry well 4 in the portion of the dry well common part wall 4b at the other end to lead the gas in the dry well 4 into the heat exchanger 16. A screen 20a is provided on the portion of the gas supply pipe 20 inside the dry well 4. The rest of the configuration is the same as those of the first to fourth embodiments.

In the present embodiment having such a configuration, the gas supply pipe 20 passes through the outer well 32. If the radioactive gases and hydrogen in the gas supply pipe 20 leak from the pipe, the radioactive gases and hydrogen are contained in the outer well 32 and release into the environment is suppressed. Since the atmosphere in the outer well 32 is inerted by nitrogen, the detonation of the hydrogen can be prevented even if the leakage of the hydrogen occurs. The screen 20a can prevent loose parts such as fragments of thermal insulation material scattering into the dry well 4 at the time of an abrupt blowdown and the like under a LOCA from being sucked into the heat exchanger 16.

Sixth Embodiment

Figure 8:
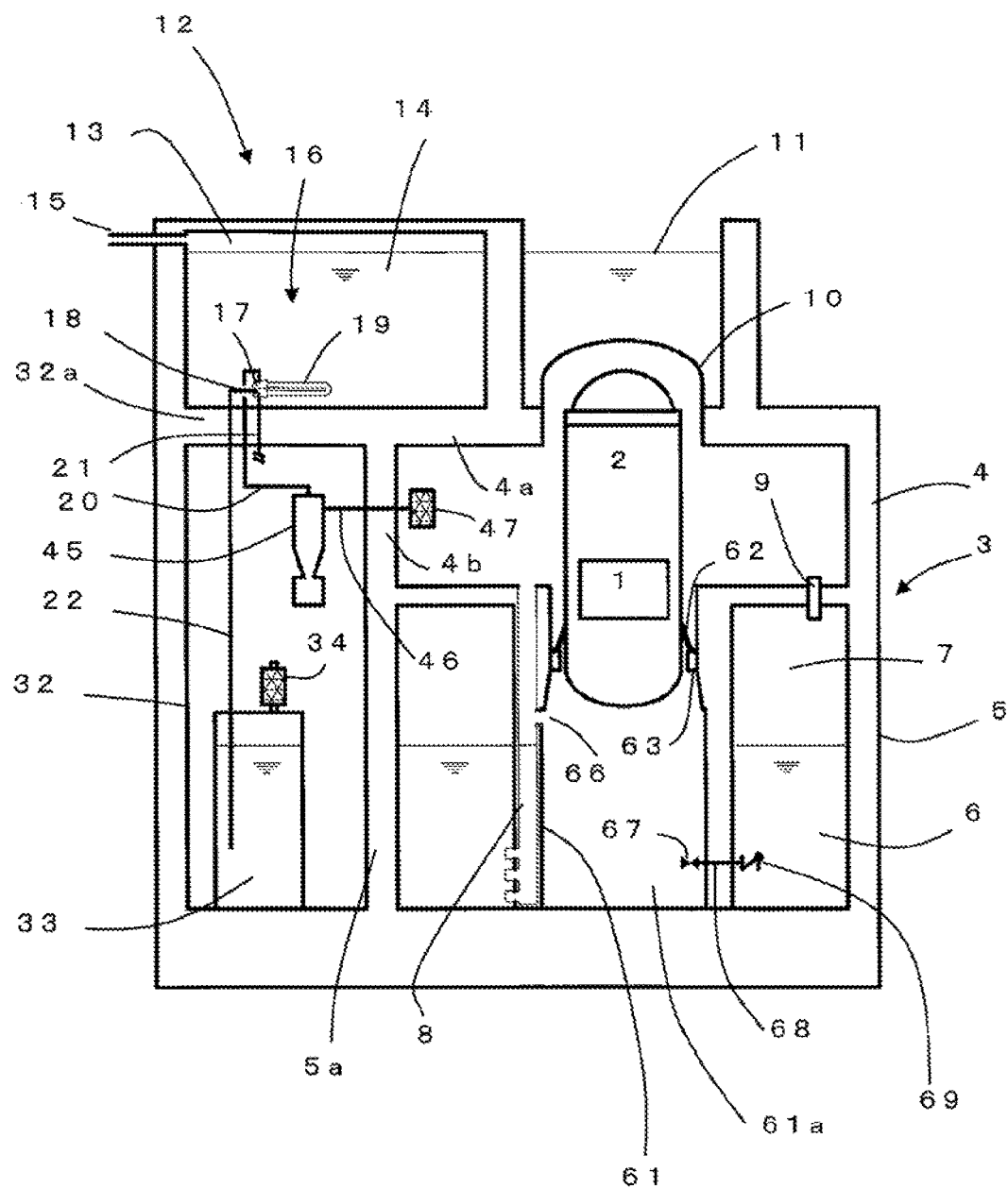
FIG. 8 is a sectional elevational view showing a configuration around a containment vessel of a nuclear power plant according to a sixth embodiment of the present invention.

FIG. 8 is a sectional elevational view showing a configuration around a containment vessel of a nuclear power plant according to a sixth embodiment of the present invention.

In the present embodiment, a cyclone separator 45 is arranged in the outer well 32. One end of the gas supply pipe 20 is connected to an outlet of the cyclone separator 45. An inlet pipe 46 extending from an inlet of the cyclone separator 45 to inside the dry well 4 is also provided. A screen 47 is arranged at the end of the inlet pipe 46 inside the dry well 4. The rest of the configuration is the same as that of the fourth embodiment.

In the present embodiment having such a configuration, loose parts such as fragments of thermal insulation material scattering into the dry well 4 at the time of an abrupt blowdown and the like under a LOCA can be prevented from being sucked into the heat exchanger 16. Most of the loose parts such as fragments are removed by the screen 47. Some fine solids may fail to be removed by the screen 47. The fine solids are led through the inlet pipe 46 into the cyclone separator 45 for removal. The removed fine solids are collected into a collection container installed under the cyclone separator 45. Since the gas flowrate inside the inlet pipe 46 at the time of a severe accident is as extremely high as approximately 25,000 m$^3$/h even in terms of steam alone, the cyclone separator 46 can highly efficiently remove the fine solids. As a result, the heat exchanger tubes 19 can be prevented from being clogged with loose parts such as fragments in the dry well 4.

Seventh Embodiment

Figure 9:
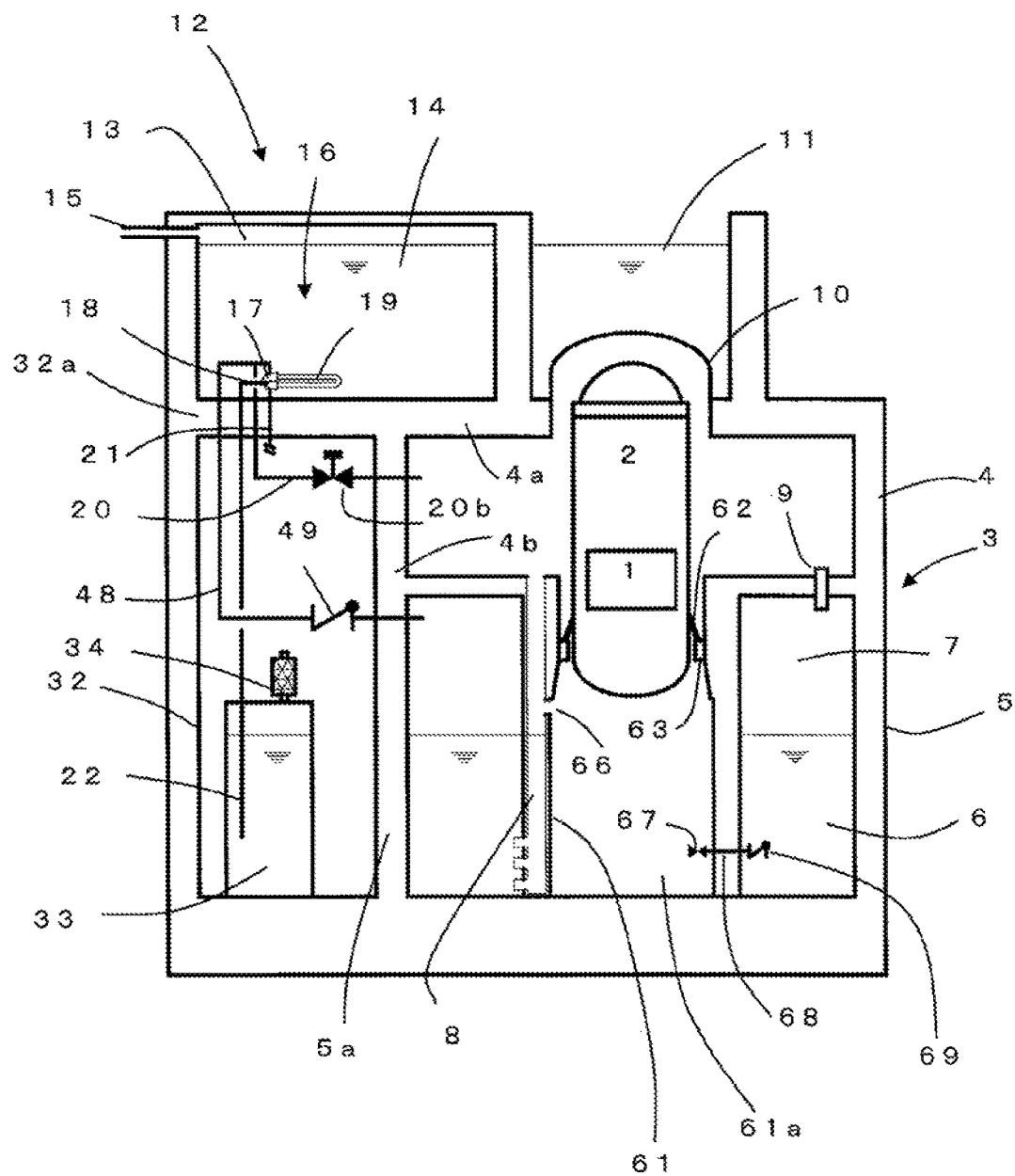
FIG. 9 is a sectional elevational view showing a configuration around a containment vessel of a nuclear power plant according to a seventh embodiment of the present invention.

FIG. 9 is a sectional elevational view showing a configuration around a containment vessel of a nuclear power plant according to a seventh embodiment of the present invention.

In the present embodiment, a new normally-closed isolation valve (gas supply isolation valve) 20b is arranged on the gas supply pipe 20. The isolation valve 20b may be any one of a motor-operated valve, a fusible valve, a squib valve, and a spring valve. A wet well gas supply pipe 48 for leading the gas in the wet well 5 to the heat exchanger 16 is further provided. One end of the wet well gas supply pipe 48 passes through the portion of the wet well common part wall 5 and opens in the wet well gas phase 7. The other end of the wet well gas supply pipe 48 is connected to a portion of the gas supply pipe 20 between the inlet plenum 17 and the isolation valve 20b. In another configuration example, the other end of the wet well gas supply pipe 48 may be connected to the inlet plenum 17 of the heat exchanger 16. The wet well gas supply pipe 48 passes through the outer well 32.

A backflow prevention device 49 is further arranged on the wet well gas supply pipe 48 to prevent the gas in the inlet plenum 17 from flowing back into the wet well gas phase 7. The backflow prevention device 49 may be either of a check valve and a vacuum breaker. In FIG. 9, the isolation valve 20b on the gas supply pipe 20 is installed in a position inside the outer well 32. However, the isolation valve 20b may be installed inside the dry well 4 or above top of the top slab 32a of the outer well 32. Since the function of the isolation vale 20b is to isolate the gas supply pipe 20, the isolation valve 20b may thus be located in any position on the gas supply pipe 20.

In the present embodiment having such a configuration, if an abrupt pressure increase occurs in the dry well 4 at the time of a blowdown and the like under a LOCA, the gas supply pipe 20 is being closed by the isolation valve 20b. Loose parts such as fragments of heat insulation material which can be produced in the dry well 4 are therefore completely prevented from flowing into the heat exchanger 16. The gas in the dry well 4 passes through the LOCA vent pipes 8 and reaches the wet well gas phase 7 via the suppression pool 6. In the process, the steam is condensed by the pool water, radioactive materials such as CsI are removed, and loose parts are removed as well.

As a result, noncondensable gases such as nitrogen, hydrogen, radioactive noble gases, and organic iodine mainly reach the wet well, gas phase 7. These gases are further led to the heat exchanger 16 via the wet well gas supply pipe 48, further pass through the scrubbing pool 33 via the gas vent pipe 22, and are released into the outer well 32. In this process, since the gas in the wet well gas phase 7 does not contain a large count of steam, the heat up of the water in the scrubbing pool 33 due to steam heat can be prevented. The amount of water held in the scrubbing pool 33 can therefore be reduced. For example, no more than 100 $m^3$ may be sufficient.

Figure 11:
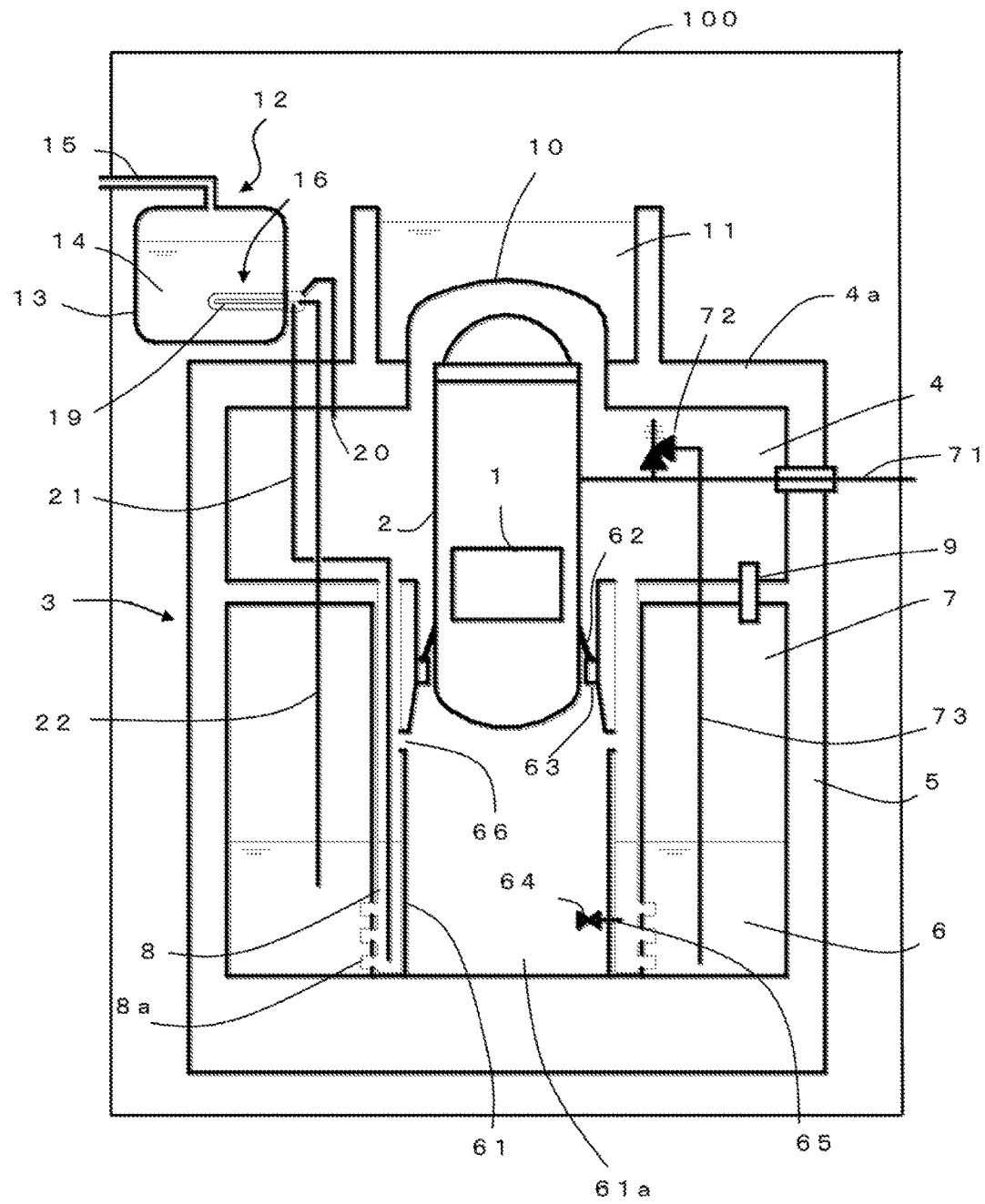
FIG. 11 is a sectional elevational view showing an example of a conventional configuration of a passive containment cooling system and a containment vessel.
Figure 12:
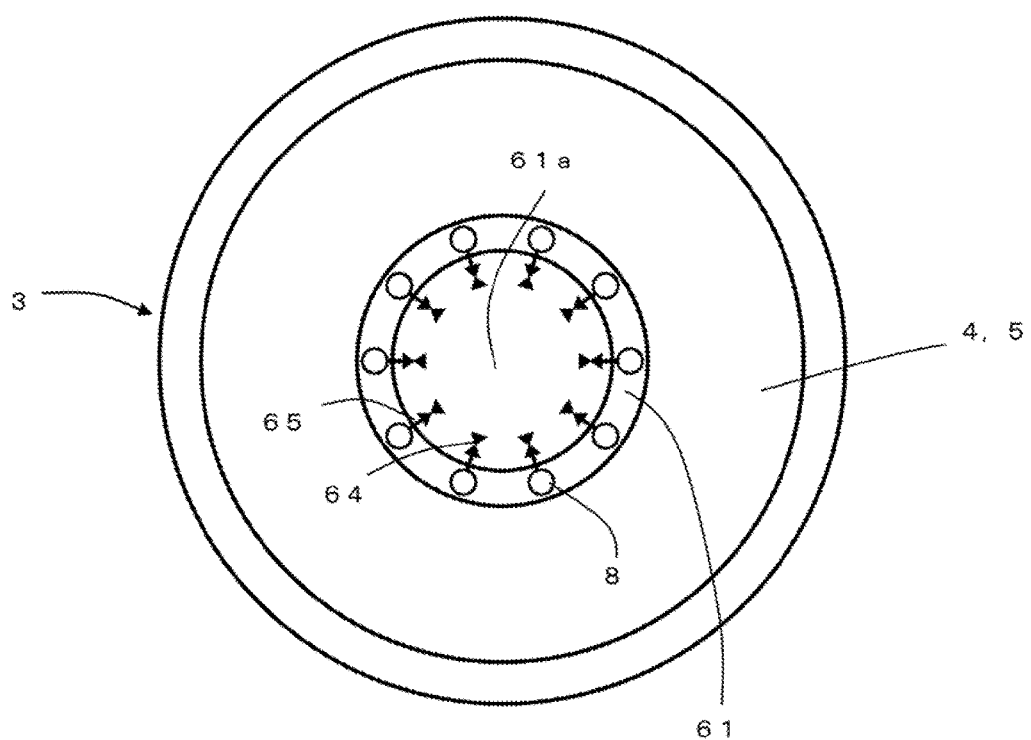
FIG. 12 is a plan view showing an example of a conventional configuration of a containment vessel and a lower dry well flooder.
Figure 13:
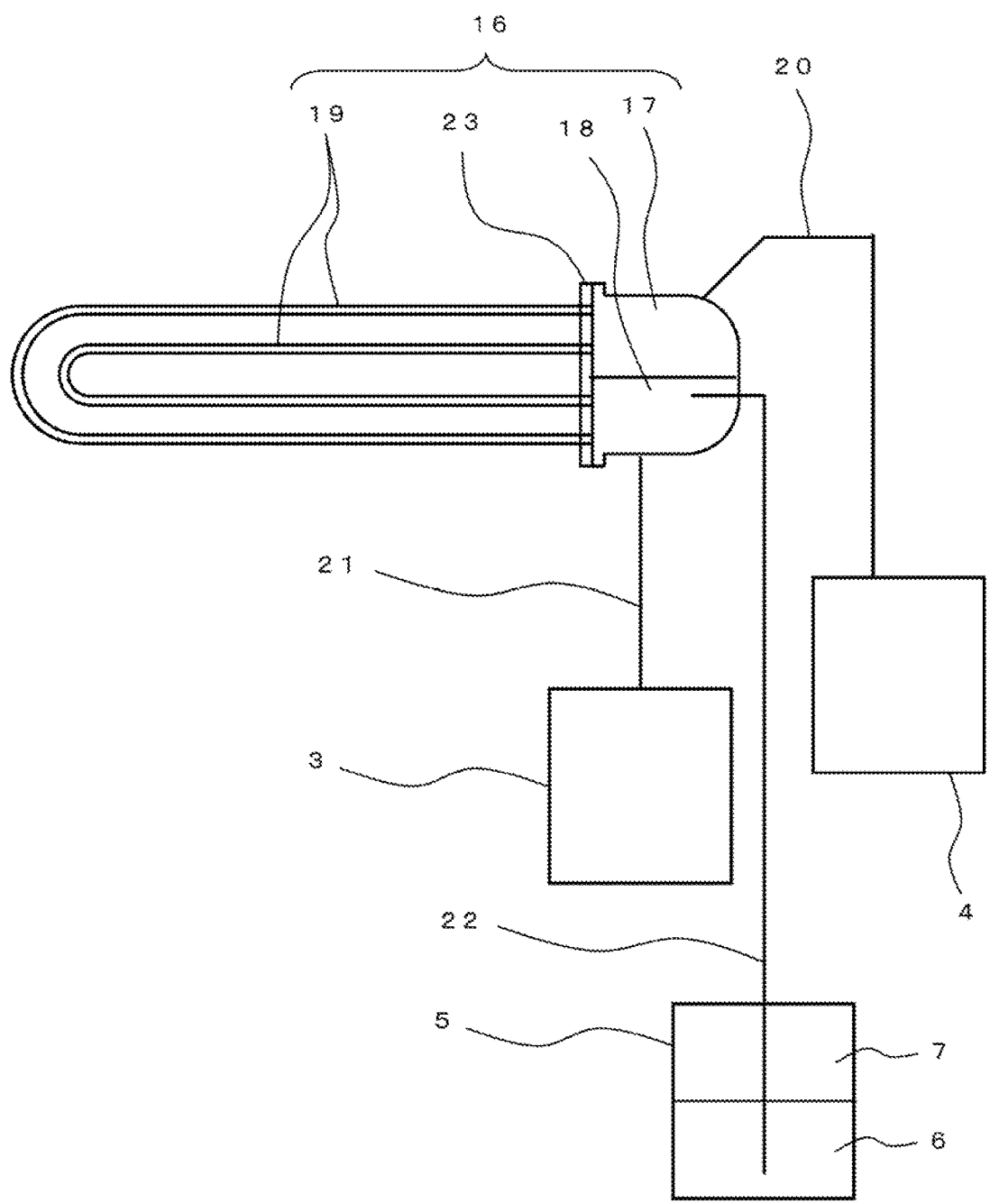
FIG. 13 is a sectional elevational view showing an example a heat exchanger of a conventional passive containment cooling system.
Figure 14:
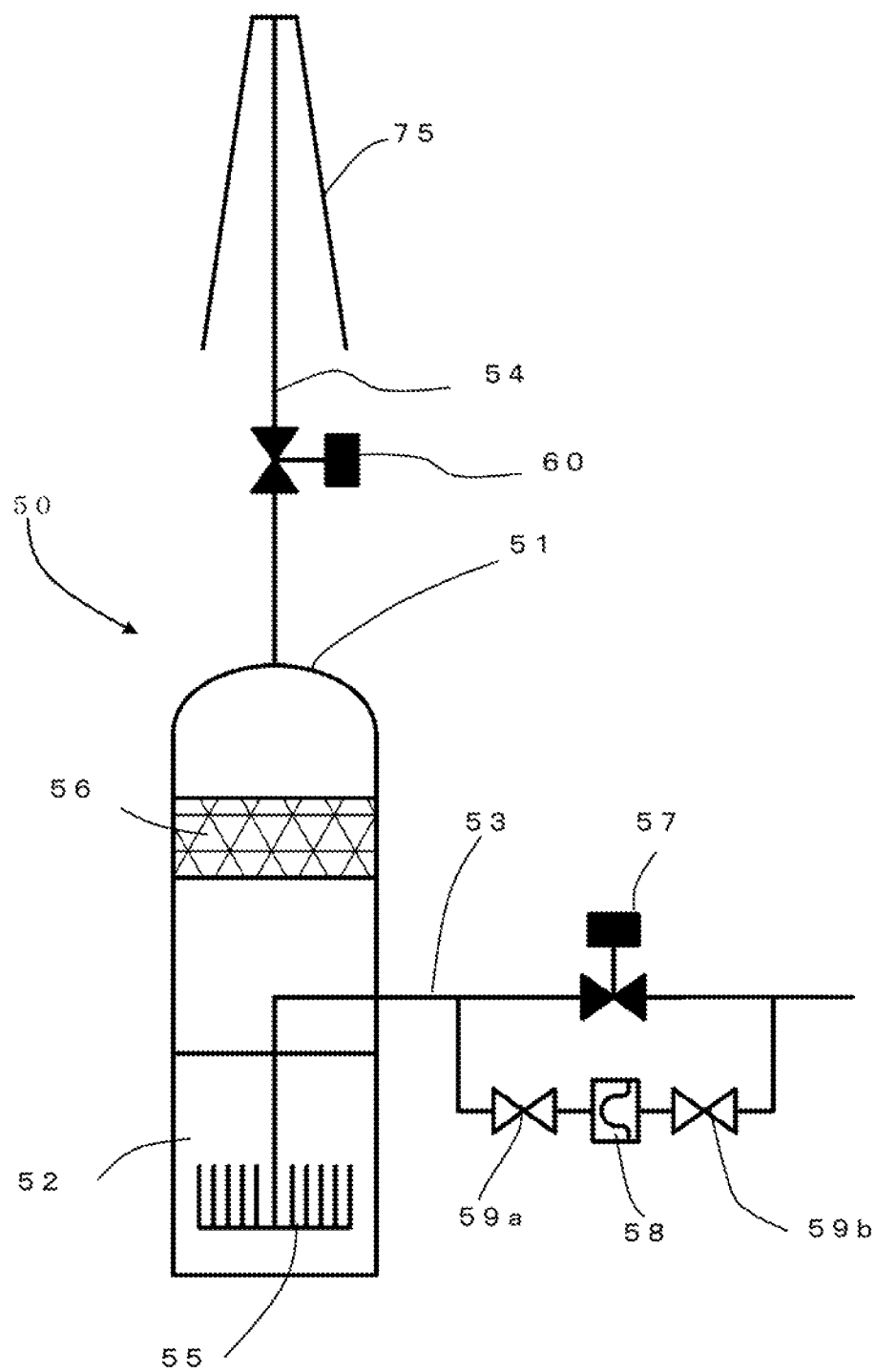
FIG. 14 is a sectional elevational view showing a design example of a conventional filtered venting system.

If a core meltdown can be avoided at the time of a station blackout (SBO), the steam in the reactor pressure vessel 2 is transferred to the suppression pool 6 via a safety relief valve (SRV) 72 (see FIG. 11) and heats up the pool water. Once the pool water reaches saturation, steam is generated in the wet well gas phase 7. In such a case, the steam in the wet well gas phase 7 is supplied to the heat exchanger 16 through the wet well gas supply pipe 48 for condensation. The flowrate of the steam in this case is equivalent to the decay heat, and the entire amount of the steam is condensed by the heat exchanger 16. The steam therefore does not transfer to the scrubbing pool 33 via the gas vent pipe 22 and heat up the pool water.

If a core meltdown occurs at the time of a station blackout (SBO) and corium melts the bottom of the reactor pressure vessel 2 through and falls into the lower dry well 61a, the feeder valves 67 are activated to flood and cool the corium. At that time, a large amount of steam is generated and through the openings 66 moves to the upper dry well. In this case also, the steam passes through the LOCA vent pipes 8 and is condensed in the suppression pool 6. The hydrogen generated here moves to the wet well gas phase 7, moves further to the heat exchanger 16 via the wet well gas supply pipe 48, passes through the scrubbing pool 83 via the gas vent pipe 22, and is released into the outer well 32. In that process, radioactive materials carried by the hydrogen are removed twice, once by the suppression pool 6 and once by the scrubbing pool 33. The water in the suppression pool 6 loses the steam condensation function after saturation. Thereafter the steam in the wet well gas phase 7 is condensed by the heat exchanger 16 of the passive containment cooling system 12 via the wet well gas supply pipe 48.

As the gas vent pipe 22 is led into the outer well 32, the noncondensable gases accumulated in the heat exchanger 16 are efficiently discharged into the outer well 32. The reason is that the pressure in the wet well gas phase 7 is maintained higher than that in the outer well 32. Although the wet well gas supply pipe 48 is connected to the wet well gas phase 7, an active fan therefore does not need to be used to forcefully vent the noncondensable gases accumulated in the heat exchanger 16 into the dry well 4 as in Patent Document 2.

The isolation valve 20b arranged on the gas supply pipe 20 therefore does not need to be opened. However, if the isolation valve 20b is opened, the steam generated by the cooling of the corium in the dry well 4 can be directly led to the heat exchanger 16 via the gas supply pipe 20 for condensation. This can provide the effect of maintaining the dry well 4 at lower pressure and temperature. In the case that the isolation valve 20b is used, it is opened after the flooder valve 67 is opened and the generation of the large amount of steam in the dry well 4 subsides. If the isolation valve 20b is opened, the gas supply pipe 20 and the wet well gas supply pipe 48 communicate with each other and the gas in the dry well 4 might flow back to the wet well gas phase 7. However, the occurrence of the backflow of the gas is prevented by the provision of the backflow prevention device 49 on the wet well gas supply pipe 48.

Eighth Embodiment

Figure 10:
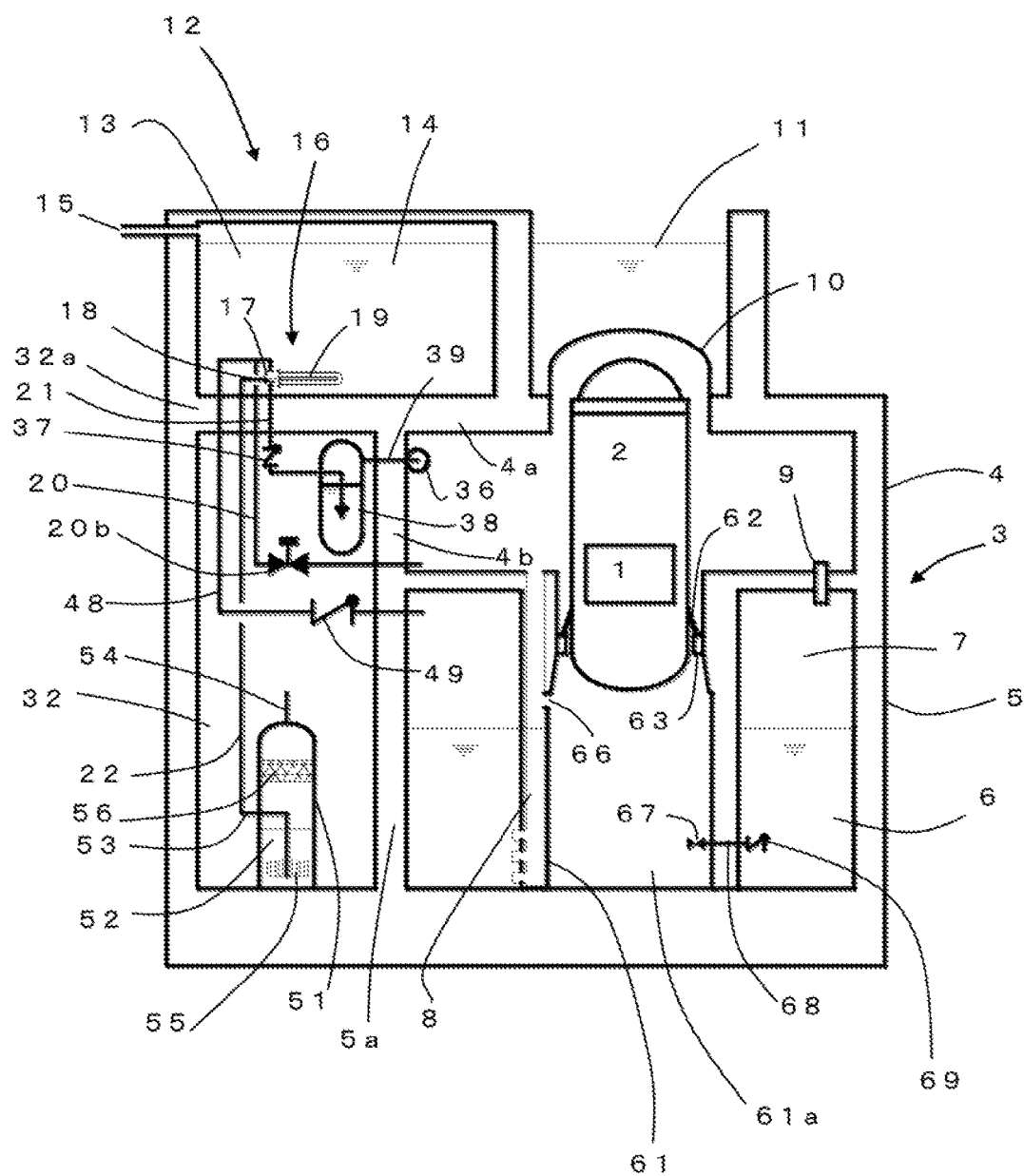
FIG. 10 is a sectional elevational view showing a configuration around a containment vessel of a nuclear power plant according to an eighth embodiment of the present invention.

FIG. 10 is a sectional elevational view showing a configuration around a containment vessel of a nuclear power plant according to an eighth embodiment of the present invention.

In the present embodiment, a filtered venting tank 51 storing decontamination water 52 inside is arranged as the scrubbing pool 33 (FIGS. 1 to 9). The end of the gas vent pipe 22 is connected to an inlet pipe 53 of the filtered venting tank 51. The filtered venting tank 51 is configured to open in the cuter well 32 via an outlet pipe 54. A metal fiber filter 56 and a Venturi scrubber 55 are arranged inside the filtered venting tank 51.

In the present embodiment having such a configuration, a filtered venting tank of an already-developed high-performance filtered venting system can be used. This provides the effect that radioactive materials can be removed with higher efficiency.

Other Embodiments

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF REFERENCE NUMERALS

1: core; 2: reactor pressure vessel; 3: containment vessel; 4: dry well; 4a: top slab; 4b: dry well common part wall; 5: wet well; 5a: wet well common part wall; 6: suppression pool; 7: wet well gas phase; 8: LOCA vent pipe; 8a: horizontal vent pipe; 9: vacuum breaker; 10: containment vessel head; 11: water shield; 12: passive containment cooling system (PCCS); 13: cooling water pool; 14: cooling water; 15: exhaust port; 16: heat exchanger; 17: inlet plenum; 18: outlet plenum; 19: heat exchanger tube; 20: gas supply pipe; 20a: screen; 20b: isolation valve (gas supply isolation valve); 21: condensate return pipe; 22: gas vent pipe; 23: tube plate; 32: outer well; 32a: top slab; 33: scrubbing pool; 33a: lid; 33b: space; 33c: first outlet pipe; 34: metal fiber filter (filter); 34c: second outlet pipe; 35: U-shaped water sea; 36: sparger; 37: check valve (condensate check valve); 38: PCCS drain tank; 39: overflow pipe; 40: water injection pipe; 41: water injection valve; 42: master valve; 43: drain pit; 45: cyclone separator; 46: inlet pipe; 47: screen; 48: wet well gas supply pipe; 49: backflow prevention device; 50; filtered venting system; 51: filtered venting tank; 52: decontamination water; 53: inlet pipe; 54: outlet pipe; 55: Venturi scrubber; 56: metal fiber filter (filter); 57: isolation valve; 58: rupture disc; 59a, 59b: isolation valve; 60: outlet valve; 61: pedestal; 61a: pedestal cavity (lower dry well); 62: RPV skirt (vessel skirt); 63: RPV support (vessel support); 64: fusible valve; 65: lower dry well flooder pipe; 66: opening; 67: flooder valve; 68: flooder pipe; 69: check valve (flooder check valve); 71: main steam pipe; 72: safety relief valve; 73: discharge pipe; 75: stack; 100: nuclear reactor building

What is claimed is:

1. A passive containment cooling and filtered venting system of a nuclear power plant, the plant including:
a core,
a reactor pressure vessel that accommodates the core,
a containment vessel including:
a dry well that contains the reactor pressure vessel,
a wet well that contains in its lower portion a suppression pool connected to the dry well via a LOCA vent pipe and includes in its upper portion a wet well gas phase,
a vacuum breaker that circulates gas in the wet well gas phase to the dry well, and
a pedestal that supports the reactor pressure vessel in the containment vessel via an RPV skirt and an RPV support and forms a pedestal cavity inside,
the passive containment cooling and filtered venting system comprising:
an outer well that is provided outside the dry well and the wet well, surrounds at least a part of the dry wall and the wet wall, adjoins the dry well via a dry well common part wall, adjoins the wet well via a wet well common part wall, and has pressure resistance and gastightness equivalent to pressure resistance and gastightness of the dry well and the wet well;
a scrubbing pool that is arranged in the outer well and stores water inside;
a cooling water pool that is installed above the dry well and the outer well and reserves cooling water;
a heat exchanger that includes an inlet plenum, an outlet plenum, and a heat exchanger tube, and is submerged at least in part in the cooling water;
a gas supply pipe that is connected to the inlet plenum of the heat exchanger at a first end of the gas supply pipe and connected to a gas phase of the containment vessel at a second end of the gas supply pipe to lead gas in the containment vessel to the heat exchanger;
a condensate return pipe that is connected to the outlet plenum of the heat exchanger at a first end of the condensate return pipe, passes through the outer well, and is connected to inside the containment vessel at a second end of the condensate return pipe to lead condensate in the heat exchanger into the containment vessel; and
a gas vent pipe that is connected to the outlet plenum of the heat exchanger at a first end of the gas vent pipe, passes through the outer well, has a second end of the gas vent pipe installed as submerged in the scrubbing pool in the outer well, and releases noncondensable gas in the heat exchanger to the outer well.

2. The passive containment cooling and filtered venting system according to claim 1, further comprising:
a lid that covers a top of the scrubbing pool to form a space above a surface of the water of the scrubbing pool; and
a first outlet pipe that is connected to the lid at a first end of the first outlet pipe and that opens to a space of the outer well at a second end of the first outlet pipe.

3. The passive containment cooling and filtered venting system according to claim 2, further comprising:
a filter that is connected to the first outlet pipe at the second end of the first outlet pipe; and
a second outlet pipe that is connected to the filter at a first end of the second outlet pipe and opens to the outer well at a second end of the second outlet pipe.

4. The passive containment cooling and filtered venting system according to claim 1, further comprising:
a flooder pipe that opens to the suppression pool at a first end of the flooder pipe and opens in the pedestal cavity at a second end of the flooder pipe;
a flooder valve that is arranged on a portion of the flooder pipe inside the pedestal cavity; and
a flooder check valve that is arranged on a portion of the flooder pipe inside the suppression pool.

5. The passive containment cooling and filtered venting system according to claim 1, wherein
the condensate return pipe includes a U-shaped water seal, and the second end of the condensate return pipe is connected to the dry well through the dry well common part wall, the U-shaped water seal being a U-bent portion storing sealing water inside.

6. The passive containment cooling and filtered venting system according to claim 5, further comprising a spray sparger at the second end of the condensate return pipe in the dry well.

7. The passive containment cooling and filtered venting system according to claim 1, further comprising:
a PCCS drain tank that stores water inside, has a gas phase in its upper portion, and is arranged inside the outer well; and an overflow pipe that connects the gas phase of the PCCS drain tank at a first end of the overflow pipe with the dry well at a second end of the overflow pipe, wherein the second end of the condensate return pipe is submerged in the water in the PCCS drain tank.

8. The passive containment cooling and filtered venting system according to claim 7, further comprising a spray sparger at the second end of the overflow pipe in the dry well.

9. The passive containment cooling and filtered venting system according to claim 7, further comprising:
a water injection pipe that is connected to below a water surface of the water in the PCCS drain tank at a first end of the water injection pipe and led into the pedestal cavity at a second end of the water injection pipe;
a water injection valve that is arranged on the water injection pipe; and
a drain pit that is located in the PCCS drain tank and stores water inside the drain pit, wherein
the second end of the condensate return pipe is submerged in the drain pit.

10. The passive containment cooling and filtered venting system according to claim 1, further comprising a condensate check valve arranged on the condensate return pipe.

11. The passive containment cooling and filtered venting system according to claim 1, wherein
the gas supply pipe is connected to the inlet plenum of the heat exchanger at the first end of the gas supply pipe, passes through the outer well, and is connected to the dry well through the dry well common part wall at the second end of the gas supply pipe to lead the gas in the dry well to the heat exchanger.

12. The passive containment cooling and filtered venting system according to claim 11, further comprising:
a cyclone separator that is arranged in the outer well; and
an inlet pipe that connects the dry well with the cyclone separator and leads gas in the dry well to the cyclone separator, wherein
the gas supply pipe is connected to an outlet of the cyclone separator at the first end to lead gas discharged from the cyclone separator to the heat exchanger.

13. The passive containment cooling and filtered venting system according to claim 11, further comprising:
a gas supply isolation valve that is installed on the gas supply pipe; and
a wet well gas supply pipe that is connected at a first end of the wet well gas supply pipe to the inlet plenum of the heat exchanger or a portion of the gas supply pipe between the inlet plenum and the gas supply isolation valve, passes through the outer well, and is connected at a second end of the wet well gas supply pipe to inside the wet well gas phase through the wet well common part wall to lead the gas in the wet well to the heat exchanger.

14. The passive containment cooling and filtered venting system according to claim 13, wherein:
the scrubbing pool is a filtered venting tank storing decontamination water inside;
the second end of the gas vent pipe is connected to an inlet pipe of the filtered venting tank; and
the filtered venting tank opens to an interior of the outer well via an outlet pipe.

15. The passive containment cooling and filtered venting system according to claim 1, further comprising a screen located on a portion of the gas supply pipe that extends inside the dry well.

16. A nuclear power plant comprising:
a containment vessel that contains a reactor pressure vessel, the containment vessel including a dry well and a wet well;
an outer well that is provided outside the dry well and the wet well, surrounds at least a part of the dry well and the wet well, and has pressure resistance and gastightness;
a scrubbing pool that is arranged in the outer well and stores water inside;
a cooling water pool that is installed above the dry well and the outer well and reserves cooling water;
a heat exchanger that includes an inlet plenum, an outlet plenum, and a heat exchanger tube, and is submerged at least in part in the cooling water;
a gas supply pipe that is connected to the inlet plenum of the heat exchanger at a first end of the gas supply pipe and connected to a gas phase of the containment vessel at a second end of the gas supply pipe to lead gas in the containment vessel to the heat exchanger;
a condensate return pipe that is connected to the outlet plenum of the heat exchanger at a first end of the condensate return pipe, passes through the outer wall, and is connected to inside the containment vessel at a second end of the condensate return pipe to lead condensate in the heat exchanger into the containment vessel; and
a gas vent pipe that is connected to the outlet plenum of the heat exchanger at a first end of the gas vent pipe, passes through the outer well, has a second end of the gas vent pipe installed as submerged in the scrubbing pool in the outer well, and releases noncondensable gas in the heat exchanger to the outer well.

* * * * *